US006725671B2

(12) United States Patent
Bishop

(10) Patent No.: US 6,725,671 B2

(45) Date of Patent: Apr. 27, 2004

(54) METHODS AND APPARATUS FOR COMPRESSED GAS

(75) Inventor: William M. Bishop, Katy, TX (US)

(73) Assignee: Enersea Transport, LLC, Houston, TX (US)

( * ) Notice: Subject to any disclaimer, the term of this patent is extended or adjusted under 35 U.S.C. 154(b) by 0 days.

(21) Appl. No.: 10/316,475

(22) Filed: Dec. 11, 2002

(65) Prior Publication Data

US 2003/0106324 A1 Jun. 12, 2003

Related U.S. Application Data

(62) Division of application No. 09/943,693, filed on Aug. 31, 2001.

(60) Provisional application No. 60/230,099, filed on Sep. 5, 2000.

(51) Int. Cl.[7] .......................... B65B 1/20; A01G 25/09; B63B 25/02

(52) U.S. Cl. ....................... 62/45.1; 141/11; 137/899.2; 114/72

(58) Field of Search .............................. 62/45.1; 141/4, 141/9, 11, 100, 104; 137/859.2; 114/256, 72, 74

(56) References Cited

U.S. PATENT DOCUMENTS

| | | | | |
|---|---|---|---|---|
| 2,795,937 | A | 6/1957 | Sattler et al. | 61/1 |
| 2,938,359 | A | 5/1960 | Cobb, Jr. et al. | 62/47 |
| 2,940,268 | A | 6/1960 | Morrison | 62/7 |
| 2,999,366 | A | 9/1961 | La Fave et al. | 62/45 |
| 3,213,632 | A | 10/1965 | Valk et al. | 62/54 |
| 3,229,473 | A | 1/1966 | Schumacher et al. | 62/55 |

(List continued on next page.)

FOREIGN PATENT DOCUMENTS

| | | | |
|---|---|---|---|
| CA | 107339 | 3/1980 | 201/148 |

OTHER PUBLICATIONS

D. Stenning; *The Coselle CNG Carrier A New Way to Shop Natural Gas by Sea* [online] [Retrieved on Jun. 21, 2000] Retrieved from the Internet:<http://www.coselle.com/tech.htm;.

D. Stenning; *The Coselle CNG Carrier A New Way to Shop Natural Gas by Sea*[online] [Retrieved on Jun. 21, 2000] Retrieved from the Internet:<URL: http://www.coselle.com/tech.htm; http://www.coselle.com/tech2.htm; http://www-.coselle.com/tech3.htm; http://www.coselle.com/tech4.htm; and http://www.coselle.com/tech5.htm.

*Primary Examiner*—William C. Doerrler

(74) *Attorney, Agent, or Firm*—Conley Rose, P.C.

(57) ABSTRACT

The methods and apparatus for transporting compressed gas includes a gas storage system having a plurality of pipes connected by a manifold whereby the gas storage system is designed to operate in the range of the optimum compressibility factor for a given composition of gas. The pipe for the gas storage system is preferably large diameter pipe made of a high strength material whereby a low temperature is selected which can be withstood by the material of the pipe. Knowing the compressibility factor of the gas, the temperature, and the diameter of the pipe, the wall thickness of the pipe may be calculated for the pressure range of the gas at the selected temperature. The gas storage system may either be modular or be part of the structure of a vessel for transporting the gas to the storage system. Since the pipe provides a bulkhead around the gas, the gas storage system may be used in a single hull vessel. The gas storage system further includes enclosing the pipes in a nitrogen atmosphere. A displacement fluid may be used to offload the gas from the gas storage system. A vessel with the gas storage system designed for a particular composition gas produced at a given location is used to transport gas from that producing location to offloading ports hundreds, or thousands, of miles from the producing location.

8 Claims, 10 Drawing Sheets

U.S. PATENT DOCUMENTS 3,232,725 A 2/1966 Secord et al. ................. 48/190
3,365,898 A 1/1968 Van Kleef ..................... 62/55
3,387,462 A 6/1968 Bauger et al. ................. 62/60
3,828,708 A 8/1974 Gerwick, Jr. et al. ...... 114/65 A
3,830,180 A 8/1974 Bolton ..................... 114/74 A
3,834,174 A * 9/1974 Strumbos .................... 62/54.3
3,848,427 A 11/1974 Loofbourow ................ 62/260
3,863,460 A 2/1975 Straile et al. .................. 62/54
3,864,918 A 2/1975 Lorenz ........................ 60/651
3,885,394 A 5/1975 Witt et al. .................... 60/651
3,950,958 A 4/1976 Loofbourow .................. 62/45
4,139,019 A 2/1979 Bresie et al. ............... 137/351
4,213,476 A 7/1980 Bresie et al. ............... 166/314
4,446,804 A 5/1984 Kristiansen et al. ...... 114/74 R
4,483,376 A 11/1984 Bresie et al. ................. 141/95
4,526,513 A 7/1985 Bogel ........................... 417/5
4,609,457 A * 9/1986 Kilroy ........................ 208/311
4,846,088 A 7/1989 Fanse et al. .................. 114/72
5,169,295 A 12/1992 Stogner et al. ............. 417/339
5,199,266 A 4/1993 Johansen ......................... 62/8
5,218,840 A 6/1993 Kolpak ...................... 73/61.44
5,276,248 A 1/1994 Engelhardt et al. ......... 585/899
5,333,465 A 8/1994 McBride ..................... 62/53.1
5,398,629 A 3/1995 Wasenius .................. 114/74 R
5,409,046 A 4/1995 Swenson et al. .............. 141/11
5,421,161 A 6/1995 Gustafson ........................ 62/7
5,429,268 A 7/1995 Hale et al. .................. 220/582
5,505,151 A 4/1996 Haaland ...................... 114/26
5,511,905 A 4/1996 Bishop et al. ................ 405/59
5,566,712 A 10/1996 White et al. ................ 137/587
5,803,005 A 9/1998 Stenning et al. .............. 114/72
5,839,383 A 11/1998 Stenning et al. .............. 114/72
6,003,460 A 12/1999 Stenning et al. .............. 114/72
6,012,530 A 1/2000 Korsgaard .................. 166/352
6,019,174 A 2/2000 Korsgaard .................. 166/352
6,201,163 B1 3/2001 Morris et al. ............... 585/899
6,217,626 B1 4/2001 Morris et al. ................. 48/190
6,230,809 B1 5/2001 Korsgaard .................. 166/352
6,339,996 B1 1/2002 Campbell ................. 114/74 R
2002/0046773 A1 4/2002 Bishop et al. .............. 137/259

* cited by examiner

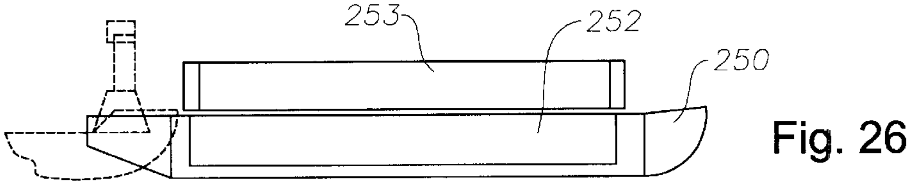
Fig. 26
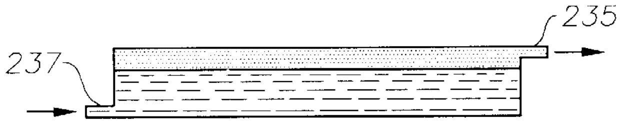
Fig. 27
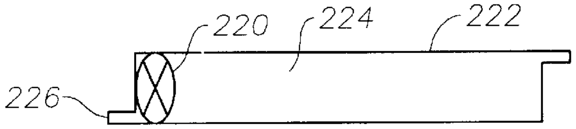
Fig. 30
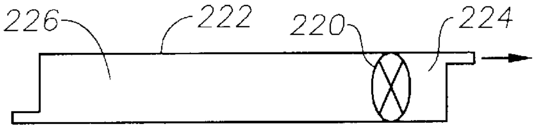
Fig. 31
Fig. 28
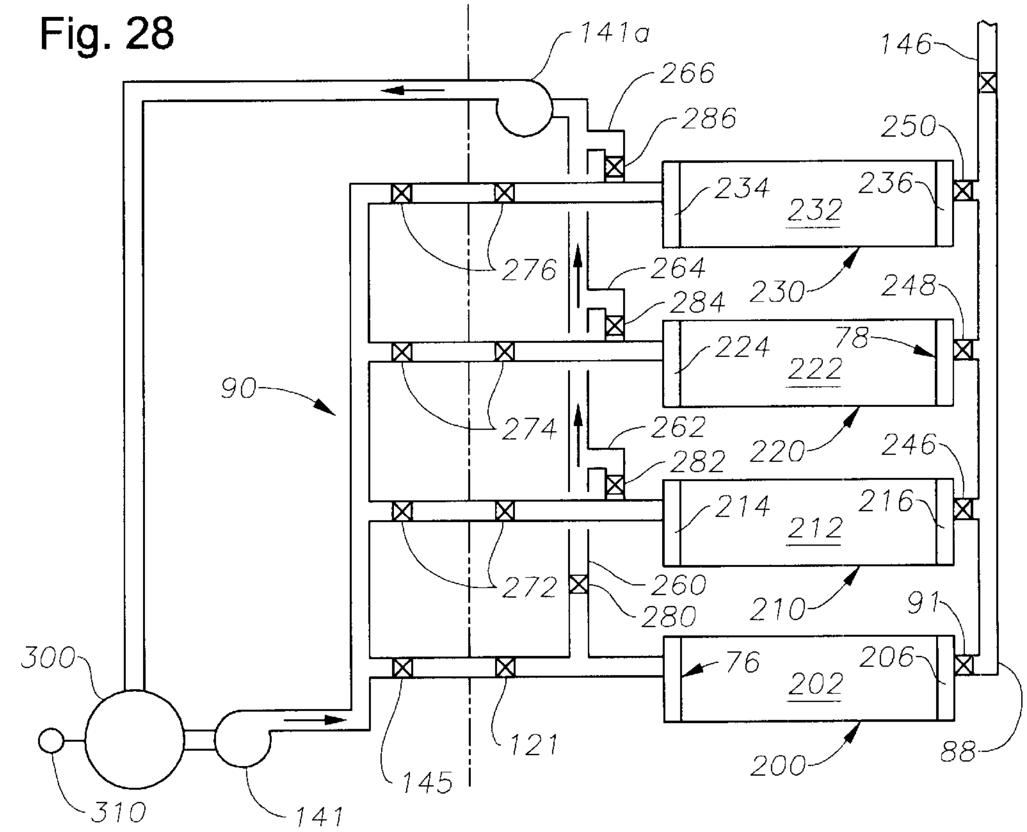

Fig. 29
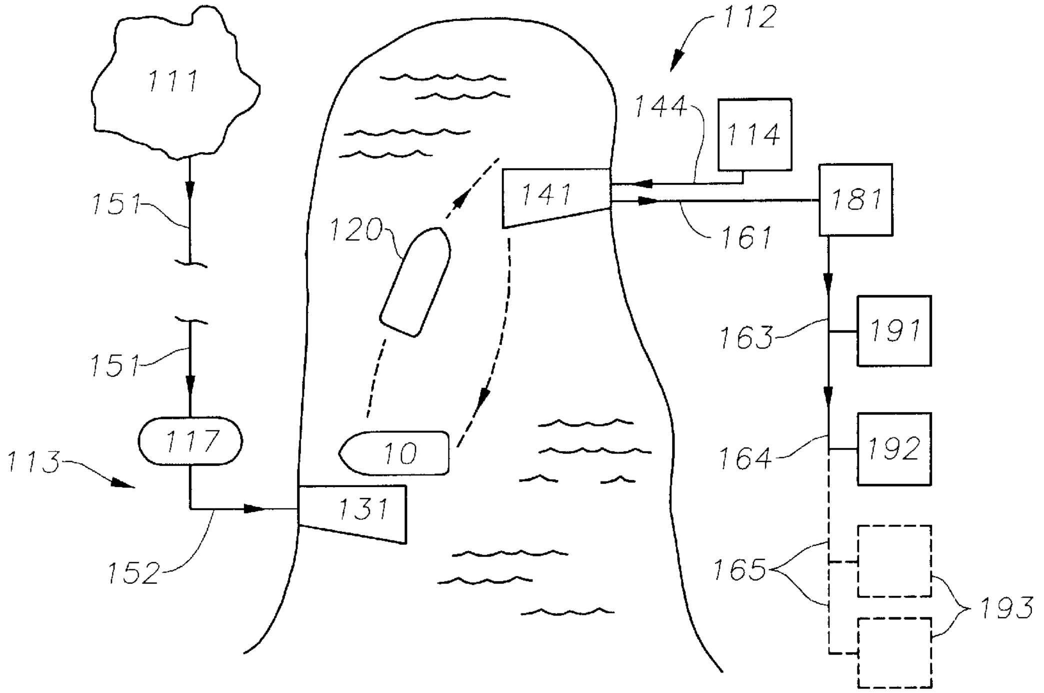
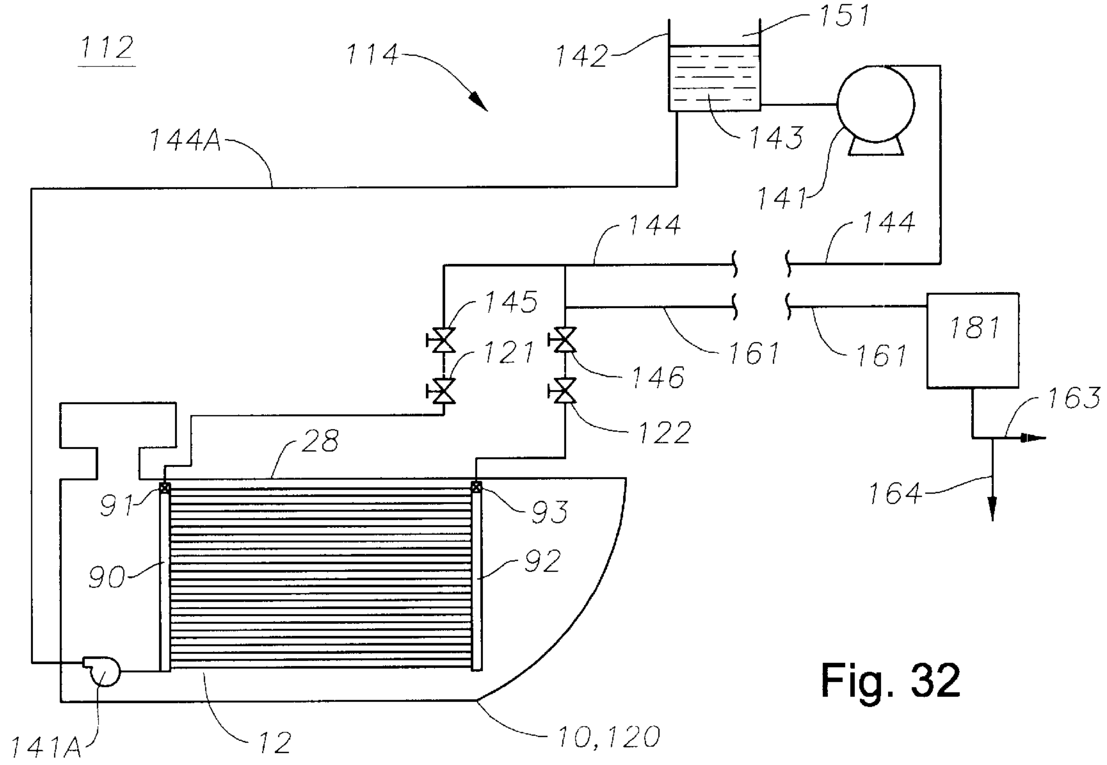
Fig. 32

METHODS AND APPARATUS FOR COMPRESSED GAS

CROSS-REFERENCE TO RELATED APPLICATIONS

The present application is a divisional application of pending U.S. patent application Ser. No. 09/943,693, filed Aug. 31, 2001 and entitled "Methods and Apparatus for Compressed Gas" which claims benefit of 35 U.S.C. 119(e) of provisional application Ser. No. 60/230,099, filed Sep. 5, 2000 and entitled "Methods and Apparatus for Transporting CNG," both hereby incorporated herein by reference, and is related to U.S. patent application Ser. No. 09/945,049 filed Aug. 31, 2001 and entitled "Methods and Apparatus for Compressible Gas" and hereby incorporated herein by reference.

STATEMENT REGARDING FEDERALLY SPONSORED RESEARCH OR DEVELOPMENT

Not applicable.

BACKGROUND OF THE INVENTION

This invention relates to the storage and transportation of compressed gases. In particular, the present invention includes methods and apparatus for storing and transporting compressed gas, a marine vessel for transporting the compressed gas and storage components for the gas, a method for loading and unloading the gas, and an overall method for the transfer of gas, or liquid, from one location to another using the marine vessel. More particularly, the present invention relates to a compressed natural gas transportation system specifically optimized and configured to a gas of a particular composition.

The need for transportation of gas has increased as gas resources have been established around the globe. Traditionally, only a few methods have proved viable in transporting gas from these remote locations to places where the gas can be used directly or refined into commercial products. The typical method is to simply build a pipeline and "pipe" the gas directly to a desired location. However, building a pipeline across international borders is sometimes too political to be practical, and in many cases is not economically viable, e.g. where the gas must be transported across water, because deep water pipelines are extremely expensive to build and maintain. For example, in 1997, the proposed 750 mile pipeline linking Russia and Turkey via the Black Sea, was estimated to have an initial cost of 3 billion dollars, without any consideration for maintenance. In addition, costs are also increased because both construction and maintenance are treacherous and require extremely skilled workers. Similarly, transoceanic pipelines are not an option in certain circumstances due to their limitations regarding depth and bottom conditions.

Due to the limitations of pipelines, other transportation methods have emerged. The most readily apparent problem with transporting gas is that in the gas phase, even below ambient temperature, a small amount of gas occupies a large amount of space. Transporting material at that volume is often not economically feasible. The answer lies in reducing the space that the gas occupies. Initially, it would seem intuitive that condensing the gas to a liquid is the most logical solution. A typical natural gas (approximately 90% $CH_4$) can be reduced to $1/600^{th}$ of its gaseous volume when it is compressed to a liquid. Gaseous hydrocarbons that are in the liquid state are known in the art as liquefied natural gas, more commonly known as LNG.

As indicated by the name, LNG involves liquefaction of the natural gas and normally includes transportation of the natural gas in the liquid phase. Although liquefaction would seem the solution to the transportation problems, the drawbacks quickly become apparent. First, in order to liquefy natural gas, it must be cooled to approximately −260° F., at atmospheric pressure, before it will liquefy. Second, LNG tends to warm during transport and therefore will not stay at that low temperature so as to remain in the liquefied state. Cryogenic methods must be used in order to keep the LNG at the proper temperature during transport. Thus, the cargo containment systems used to transport LNG must be truly cryogenic. Third, the LNG must be re-gasified at its destination before it can be used. This type of cryogenic process requires a large initial cost for LNG facilities at both the loading and unloading ports. The ships require exotic metals to hold LNG at −260° F. The cost is generally in excess of one billion dollars for a full scale facility for one particular route for loading and unloading the LNG which often makes the method uneconomical for universal application. Liquefied natural gas can also be transported at higher temperatures than −260° F. by raising the pressure, however the cryogenic problems still remain and the tanks now must be pressure vessels. This too can be an expensive alternative.

In response to the technical problems of a pipeline and the extreme costs and temperatures of LNG, the method of transporting natural gas in a compressed state was developed. The natural gas is compressed or pressurized to higher pressures, which may be chilled to lower than ambient temperatures, but without reaching the liquid phase. This is what is commonly referred to as compressed natural gas, or CNG.

Several methods have been proposed heretofore that are related to the transportation of compressed gases, such as natural gas, in pressurized vessels, either by marine or overland carriers. The gas is typically transported at high pressure and low temperature to maximize the amount of gas contained in each gas storage system. For example, the compressed gas may be in a dense single-fluid ("supercritical") state.

The transportation of CNG by marine vessels typically employs barges or ships. The marine vessels include in their holds, a multiplicity of closely stacked storage containers, such as metal pressure bottle containers. These storage containers are resistant internally to the high pressure and low temperature conditions under which the CNG is stored. The holds are also internally insulated throughout to keep the CNG and its storage containers at approximately the loading temperature throughout the delivery voyage and also to keep the substantially empty containers near that temperature during the return voyage.

Before the CNG is transported, it is first brought to the desired operating state, e.g. by compressing it to a high pressure and refrigerating it to a low temperature. For example, U.S. Pat. No. 3,232,725, hereby incorporated herein by reference for all purposes, discloses the preparation of natural gas to conditions suitable for marine transportation. After compression and refrigeration, the CNG is loaded into the storage containers of the marine vessels. The CNG is then transported to its destination. A small amount of the loaded CNG may be consumed as fuel for the transporting vessel during the voyage to its destination.

When reaching its destination, the CNG must be unloaded, typically at a terminal comprising a number of high pressure storage containers or an inlet to a high pressure turbine. If the terminal is at a pressure of, for example, 1000 pounds per square inch ("psi") and the marine vessel storage containers are at 2000 psi, valves may be opened and the gas expanded into the terminal until the pressure in the marine vessel storage containers drops to some final pressure between 2000 psi and 1000 psi. If the volume of the terminal is very much larger than the combined volume of all the marine vessel storage containers together, the final pressure will be about 1000 psi.

Using conventional procedures, the transported CNG remaining in the marine vessel storage containers (the "residual gas") is then compressed into the terminal storage container using compressors. Compressors are expensive and increase the capital cost of the unloading facilities. Additionally, the temperature of the residual gas is increased by the heat of compression. This increases the required storage volume unless the heat is removed and raises the overall cost of transporting the CNG.

Previous efforts to reduce the expense and complexity of unloading CNG, and the residual gas in particular, have introduced problems of their own. For example, U.S. Pat. No. 2,972,873, hereby incorporated herein by reference for all purposes, discloses heating the residual gas to increase its pressure, thereby driving it out of the marine vessel storage containers. Such a scheme simply replaces the additional operating cost associated with operating the compressors with an operating cost for supplying heat to the storage containers and residual gas. Further, the design of the piping and valve arrangements for such a system is necessarily extremely complex. This is because the system must accommodate the introduction of heating devices or heating elements into the marine vessel storage containers.

In summary, although CNG transportation reduces the capital costs associated with LNG, the costs are still high due to a lack of efficiency by the methods and apparatus used. This is due primarily to the fact that prior art methods do not optimize the vessels and facilities for a particular gas composition. In particular, prior art apparatus and methods are not designed based upon a specific composition of gas to determine the optimum storage conditions for a particular gas.

U.S. Pat. No. 4,846,088 discloses the use of pipe for compressed gas storage on an open barge. The storage components are strictly confined to be on or above the deck of the ship. Compressors are used to load and off load the compressed gas. However, there is no consideration of a pipe design factor and no attempt to obtain the maximum compressibility factor for the gas.

U.S. Pat. No. 3,232,725 does not contemplate a specific compressibility factor to then determine the appropriate pressure for the gas. Instead, the '725 patent discloses a broad range or band to get greater compressibility. However, to do that, the gas container wall thickness will be much greater than is necessary. This would be particularly true when operated at a lower pressure causing the pipe to be over designed (unnecessarily thick). The '725 patent shows a phase diagram for a mixture of methane and other hydrocarbons. The diagram shows an envelop inside which the mixture exists as both a liquid and a gas. At pressures above this envelop the mixture exists as a single phase, known as the dense phase or critical state. If the gas is pressured up within that state, liquids will not fall out of the gas. Also, good compression ratios are achieved in that range. Thus, the '725 patent recommends operation in that range.

The '725 patent graph is based on the lowering of temperatures. However, the '725 patent does not design its method and apparatus by optimizing the compressibility factor at a certain temperature and pressure and then calculating the wall thickness needed for a certain gas. Since much of the capital cost comes from the large amount of metal, or other material, required for the pipe storage components, the '725 misses the mark. The range offered in the '725 patent is very broad and is designed to cover more than one particular gas mixture, i.e., gas mixtures with different compositions.

U.S. Pat. No. 4,446,232 discloses offloading using a displacing fluid. The '232 patent does not consider low temperature fluids. It also does not consider onshore storage and thermal shock. The '332 patent carries the displacement fluid on the vessel which is used to displace sequential tanks. No mention is made of low temperature requirements.

The present invention overcomes the deficiencies of the prior art by providing a method for optimizing a transportation vessel for compressed gas; the design of that transportation vessel and design of the storage components for the gas aboard that vessel; a method for loading and unloading the gas; and an overall method for the transfer of gas from one location to another using the optimized transportation vessel; as well as specific apparatus for use with the methods.

SUMMARY OF THE INVENTION

The methods and apparatus of the present invention for transporting compressed gas includes a gas storage system optimized for storing and transporting a compressible gas. The gas storage system includes a plurality of pipes in parallel relationship and a plurality of support members extending between adjacent tiers of pipe. The support members have opposing arcuate recesses for receiving and housing individual pipes. Manifolds and valves connect with the ends of the pipe for loading and off-loading the gas. The pipes and support members form a pipe bundle which is enclosed in insulation and preferably in a nitrogen and enriched environment.

The gas storage system is optimize or storing a compressible gas, such as natural gas, in the dense phase under pressure. The pipes are made of material which will withstand a predetermined range of temperatures and meet required design factors for the pipe material, such as steel pipe. A chilling member cools the gas to a temperature within the temperature range and a pressurizing member pressurizes the gas within a predetermined range of pressures at a lower temperature of the temperature range where the compressibility factor of the gas is at a minimum. The preferred temperature and pressure of the gas maximizes the compression ratio of gas volume within the pipes to gas volume at standard conditions. The compression ratio of the gas is defined as the ratio between the volume of a given mass of gas at standard conditions to the volume of the same mass of gas at storage conditions.

As for example, one preferred embodiment of the gas storage system includes pipes made of X-60 or X-80 premium high strength steel with the gas having a temperature range of between −20° F. and 0° F. The lower temperature in the range is −20° F. For X-100 premium high strength steel, the lower temperature may be negative 40° F. For a gas with a specific gravity of about 0.6, the pressure range is between 1,800 and 1,900 psi and for a gas with a specific gravity of about 0.7, the pressure range is between 1,300 and 1,400 psi. The range of pressures at the lower temperature is the pressure range where the compressibility factor varies no more than two percent of the minimum compressibility factor for a gas with a particular specific gravity.

Once the strength of the steel and the pipe diameter are selected, for a given design factor, the pipe wall thickness is determined by maximizing the ratio of the mass of the stored gas to the mass of the steel pipe. By way of further example, for a gas with a specific gravity of substantially 0.6 and where the design factor is one-half the yield strength of the steel pipe having a yield strength of 100,000 psi and a pipe diameter of 36 inches, the pipe wall thickness will be between 0.66 and 0.67 inches. For a gas with a specific gravity of substantially 0.7 in the above example, the pipe wall thickness will be between 0.48 and 0.50 inches.

The wall thickness of the pipe may be increased by adding an additional thickness of material for a corrosion or erosion allowance. This thickness is above the thickness required to maintain the resultant yield stress. This allowance may be as much as 0.063 inches or greater depending on the application. The large diameter pipe used in the current invention allows this allowance to be incorporated without unacceptable degradation of the system efficiency. Although the preferred embodiment of the present invention uses high strength carbon steel pipe, other materials may find application in this system. Materials such as stainless steels, nickel alloys, carbon-fiber reinforced composites, as well as other materials may provide an alternative to high strength carbon steel.

The present invention is particularly directed to methods and apparatus for transporting compressed gases on a marine vessel. Preferably the gas storage system on the marine vessel is designed for transporting a gas with a particular gas composition. Where the gas to be transported varies from the design gas composition for the gas storage system, a gas of a second gas composition may be added or removed from the gas to be transported until the resultant gas has the same gas composition as the particular gas composition for which the gas storage system is designed.

The gas storage system may be an integral part of the marine vessel. The marine vessel may include a hull having a support structure with the pipes of the gas storage system forming a portion of the support structure. The hull may be divided into compartments each having a nitrogen atmosphere with a chemical monitoring system to monitor for gas leaks. A flare system may also be included to bleed off any leaking gas. The hull is insulated preventing the temperature of the gas from raising more than ½° per 1,000 miles of travel of the marine vessel. As an alternative, the marine vessel may include a hull constructed from concrete with gas storage pipes built into the hull section. A bow section is connected to one end of the hull section and a stern section is connected to the other end of the hull section.

The gas storage system may be built as a modular unit with the modular unit either being supported by the deck of the marine vessel or being installed within the hull of the marine vessel. The pipes in the modular unit may extend either vertically or horizontally with respect to the deck.

The stored gas is preferably unloaded by pumping a displacement fluid into one end of the gas storage system and opening the other end of the gas storage system to enable removal of the gas. A displacement fluid is selected which has a minimal absorption by the gas. A separator may be disposed in the gas storage system to separate the displacement fluid from the gas to further prevent absorption. Preferably, the gas is off-loaded one tier of pipes at a time. The gas storage system may also be tilted at an angle to assist in the off-loading operation.

The method of transporting the gas includes optimizing the gas storage system on the marine vessel for a particular gas composition for a gas being produced at a specific geographic location. The system includes a loading station at the source of the natural gas and a receiving station for unloading the gas at its destination. The gas storage system is optimized at a pressure and temperature that minimizes the compressibility factor of the gas and maximizes the compression ratio of the gas.

Although the present invention is particularly directed to methods and apparatus for transporting compressed gas, it should be appreciated that the embodiments' of the present invention are also applicable to transporting liquids such as liquid propane.

The embodiments of the present invention provide many unique features including but not limited to:

a) Structural integration of a gas storage system with a marine vessel to structurally stiffen the marine vessel, with the storage system including supports serving as bulkheads, the storage system components serving as bulkheads, the gas storage system serving as buoyancy, and the storage system providing storage of all gases and liquids;

b) Construction of a gas storage system as a containerized system allowing the transport of the system on the deck, or in the hull, of a marine vessel wherein the gas storage system is essentially independent of the structure of the marine vessel;

c) Staged off-loading using low freezing point liquid stored either on-shore or on the marine vessel;

d) Off-loading using liquid driven pigs to separate the gas from the liquid;

e) Matching of gas storage pipe dimensions, such as diameter and wall thickness, to the optimized compressibility factor for the composition of a defined gas supply so as to minimize the weight of the steel per unit weight of stored gas on the vessel;

f) Use of premium pipe, manufactured to accepted standards, such as API, ASME, or class society rules, as storage on a marine vessel with a design factor higher than that for individually built pressure vessels, i.e., the design factor being higher than 0.25 or similar standard;

g) Insulation lining of entire hull or the assembly of containers, reducing temperature rise to an acceptable rate for the desired service, such as less than one degree per 100 hours of travel;

h) Trimming of a marine vessel, or tilting of a gas storage system, in order to decrease surface contact area between gas cargo and displacement liquid and maximize the evacuation of displacement liquid from the gas storage system;

i) Taking pressure drop across control valve during the off-loading phase either on-shore or on the vessel but outside of the primary gas containers;

j) Use of manifolding to isolate the specific pipes of a gas storage system most prone to damage, such as the sides and bottom of the vessel, from external causes;

k) Hydrostatic testing during liquid displacement; and l) Method of construction of a marine vessel.

An advantage of the present invention is that the high capital costs and cryogenic procedures normally associated with transporting natural gas across water may be significantly reduced making the profitability of the present invention greater than previously used methods and apparatus.

The present invention includes improvement of CNG storage and transportation methods and apparatus, by optimizing the CNG storage conditions, thereby overcoming the deficiencies of the prior methods of natural gas storage and transportation.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIG. 26 is a side elevational view of the barge of FIG. 24 with oil stored in the hull and a pipe modular unit disposed on the deck;

FIG. 27 is a schematic of a vessel for liquid displacement of the stored gas;

FIG. 28 is a schematic of a staged off-load of the gas stored in the gas storage pipes using a displacement liquid;

FIG. 29 is a schematic of the method of transporting gas from an on-loading port having gas production to an off-loading port with customers;

FIG. 30 is a side view of a storage pipe with a pig in one end for displacing the stored gas;

FIG. 31 is a side view of the storage pipe of FIG. 30 with the pig at the other end of the pipe having displaced the stored gas;

FIG. 32 is a schematic of a method for on-loading and off-loading gas from the vessel having gas storage pipes.

Figure 1:
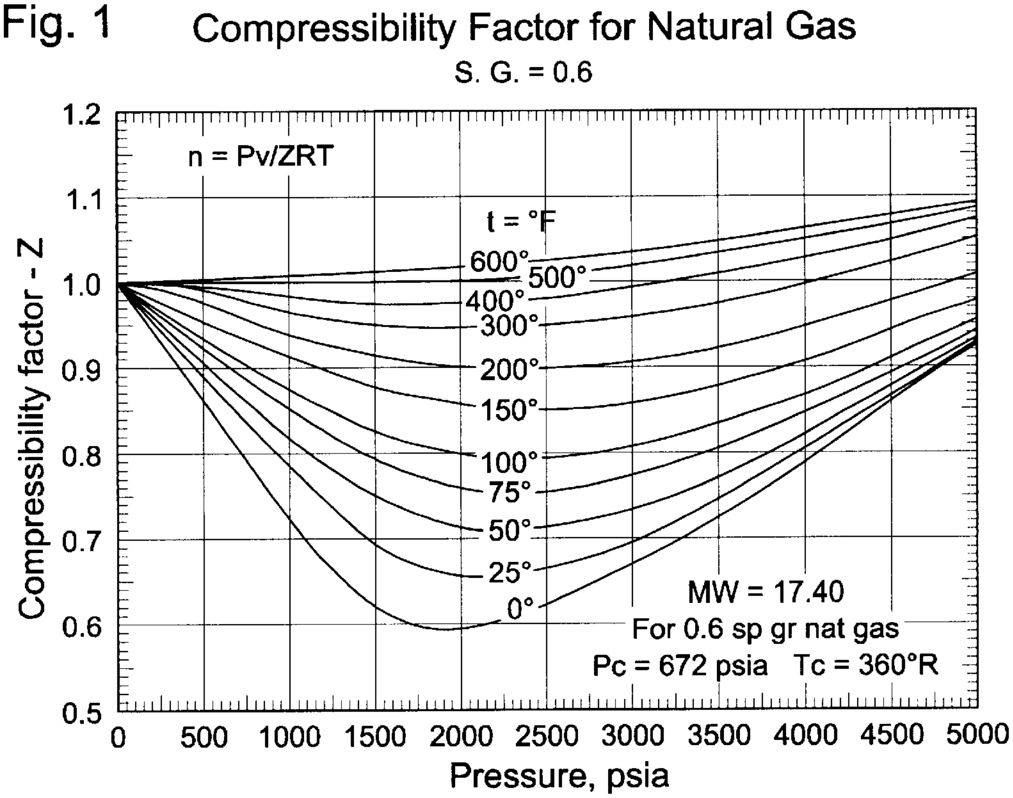
FIG. 1 is a graph of gas compressibility factor versus gas pressure for a gas with a specific gravity of 0.6.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

BRIEF DESCRIPTION OF THE PREFERRED EMBODIMENTS

In the description which follows, like parts are marked throughout the specification and drawings with the same reference numerals, respectively. The drawing figures are not necessarily to scale. Certain features of the preferred embodiments may be shown in exaggerated scale or in somewhat schematic form and some details of conventional elements may not be shown in the interest of clarity and conciseness. It is understood that the systems disclosed in this application are intended to be designed in accordance with applicable design standards for the uses intended, as published by recognized regulatory agencies, such as the U.S. Coast Guard, American Bureau of Shipping (ABS), American Petroleum Institute (API), American Society of Mechanical Engineering (ASME).

The present invention is directed to several areas including but not limited to methods and apparatus for gas storage and transportation aboard a marine vessel; methods of construction and apparatus for the marine vessel; methods and apparatus for on-loading and off-loading gas to and from a gas storage system aboard a marine vessel; and methods for port-to-port transportation of gas. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different constructions and methods of operation of the apparatus of the present invention. The embodiments of the present invention provide a plurality of methods for using the apparatus of the present invention. It is to be fully recognized that the different teachings of the embodiments discussed below may be employed separately or in any suitable combination to produce desired results. Reference to up or down will be made for purposes of description with up meaning away from the ocean's surface and down meaning toward the ocean's floor.

It should be appreciated that the present invention may by used with any gas and is not limited to natural gas. The description of the preferred embodiments for the storage and transportation of natural gas is by way of example and is not to be limiting of the present invention.

CNG Storage

The preferred embodiment of the gas storage system is designed for gas temperatures and pressures where the gas is maintained in a dense single-fluid ("supercritical") state, also known as the dense phase. This phase occurs at high pressures where separate liquid and gas phases cannot exist. For example, separate phases for compressed natural gas, or CNG, do occur once the gas drops to around 1000 psia. As long as the natural gas, which is primarily methane, is maintained in the dense phase, the heavier hydrocarbons, such as ethane, propane and butane, that contribute to a low compressibility value, do not drop out when the gas is chilled to the gas storage temperature at the gas storage pressure. Thus, in the preferred embodiment, the natural gas is compressed or pressurized to higher pressures and chilled to lower than ambient temperatures, but without reaching the liquid phase, and stored in the gas storage system. Maintaining the gas as CNG rather than LNG, avoids the requirement of cryogenic processes and facilities with a large initial cost at both the loading and unloading ports.

The methods and apparatus of the present invention optimize the compression of the gas to be transported. The optimization of the CNG storage increases payload while reducing the amount of material needed for the storage components, thereby increasing the efficiency of transport and reducing capital costs. To calculate the optimized compression of the gas to be transported, the compressibility factor is minimized and the mass of stored gas to mass of container ratio is maximized at a given pressure as compared to standard conditions for a particular gas. In the preferred embodiment described, the gas to be transported is natural gas. However, the present invention is not limited to natural gas and may be applied to any gas. Additionally, the means of maximizing the amount of stored gas per unit of material may be used for stationary storage as well, such as onshore, at-shore, or offshore platforms.

With any gas, the compressibility factor varies with the composition of the gas, if it is a mixture, as well as with the pressure and temperature conditions imposed on the gas. According to the present invention, the optimum conditions are found by lowering the temperature and maintaining the pressure at a point that minimizes the compressibility factor. For natural gas, the compression ratio for this mode of transportation typically varies from 250 to 400, depending on the composition of the gas. Once the optimum pressure-temperature condition is determined for the particular gas to be transported, the required dimensions for the storage containment system may be determined.

Calculating the compression for the gas determines the conditions where the gas will occupy the smallest possible volume. The gas equation of state determines the volume, V, for a given mass of gas m, namely:

$$V=mZ\,RT/P \qquad (1)$$

where Z is the compressibility factor, T is temperature, R is the specific gas constant and P is pressure. For a given gas composition, Z is a function of both temperature and pressure and is usually obtained experimentally or from computer models. As can be seen from the equation, as Z decreases so does V for the same mass of gas, thus the lowest value of Z for a given operating temperature is desired.

Since storage volume also decreases with T, the desired operating temperature is also considered as an important factor. According to the present invention, cryogenics are to be avoided but moderately low temperatures are desirable. As temperatures decrease, metals become brittle and metal toughness decreases. Many regulatory codes limit the use of certain groups of metals to finite ranges of temperatures in order to ensure safe operation. Regular carbon steel is widely accepted for use at temperatures down to −20° F. High strength steel such as X-100 (100,000 psi yield strength) is widely accepted for use at temperatures down to about −60° F. Other high strength steels include X-80 and X-60. The selection of the steel for the storage containment system is dependant upon several design factors including but not limited to Charpy strength, toughness, and ultimate yield strength at the design temperatures and pressures for the gas. It of course is necessary that the storage containment system meet code requirements for these factors as applied to the particular application. By way of example the maximum stress level for the storage containment system is the lower of ⅓ the ultimate tensile strength or ½ the yield strength of the material. Since ½ the yield strength of X-80 and X-60 steel is less than ⅓ their yield strength, these high strength steels may be preferred over X-100 steel.

By way of example, assuming an X-80 or X-60 high strength steel for the storage containment system, the preferred storage containment system may have a lower temperature limit of −20° F. to provide an appropriate margin of safety for the preferred embodiment of the gas storage containment system, although lower temperatures may be possible depending upon the desired margin of safety and type of material used. For example, a lower temperature limit of −40° F. may be possible using a premium high strength steel such as X-100 and a smaller margin of safety.

Figure 3:
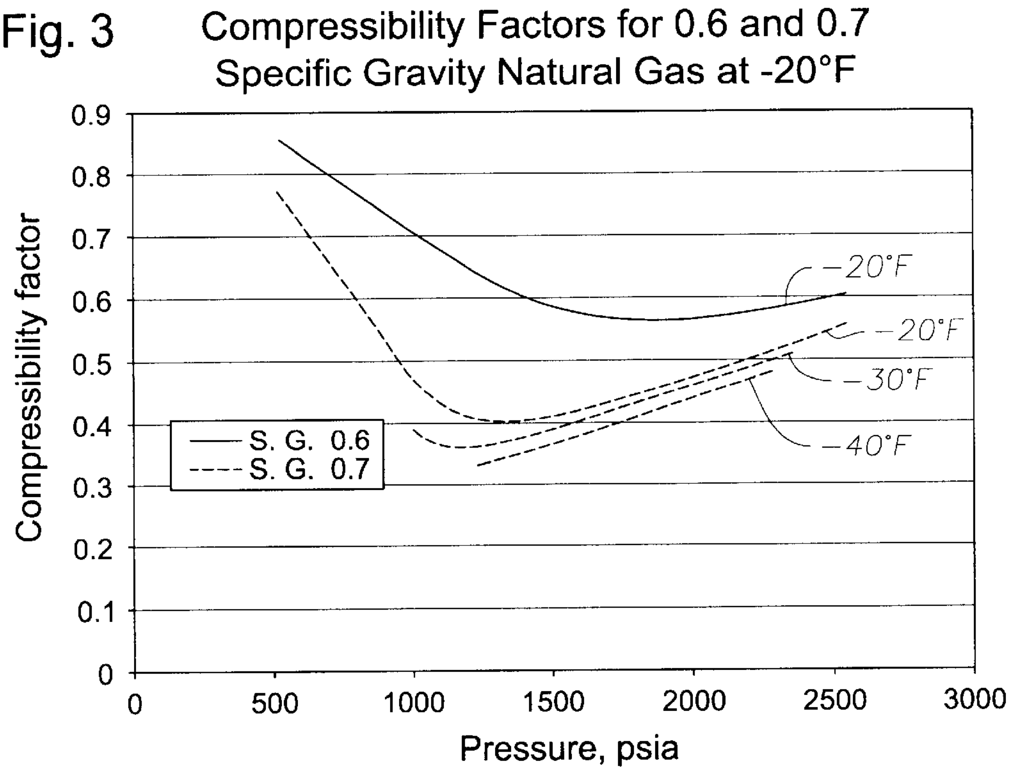
FIG. 3 is an enlarged view of the −20° F. curves for the 0.6 and 0.7 specific gravity gases shown in FIGS. 1 and 2.

The following is a description of one preferred embodiment of the present invention for a gas having a particular composition including a specific gravity of 0.6. An X-100 high strength steel is used for the storage containment system with the preferred storage containment system having a lower temperature limit of −20° F. to provide a predetermined margin of safety for the system. FIG. 1 is a graph of the compressibility factor Z versus gas pressure for a gas with a specific gravity of 0.6. The 0.6 specific gravity is representative of that obtained from a dry gas reservoir having a composition comprising primarily methane and low in other hydrocarbons. The values of Z have been obtained from the American Gas Association (AGA) computer program developed for this purpose. The AGA methodology as applied at a temperature of −20° F., as the design temperature for the storage components, is presented in FIG. 3. Referring to FIG. 3, it is clear that the lowest value of Z, for a specific gravity of 0.6, occurs at about 1840 psia at −20° F. Based on equation (1), the minimum volume to store this gas is obtained by designing the storage components to withstand at least 1840 psia plus appropriate safety margins. These conditions give a compression ratio of approximately 265 of gas volume at standard conditions to gas volume at storage conditions.

Figure 2:
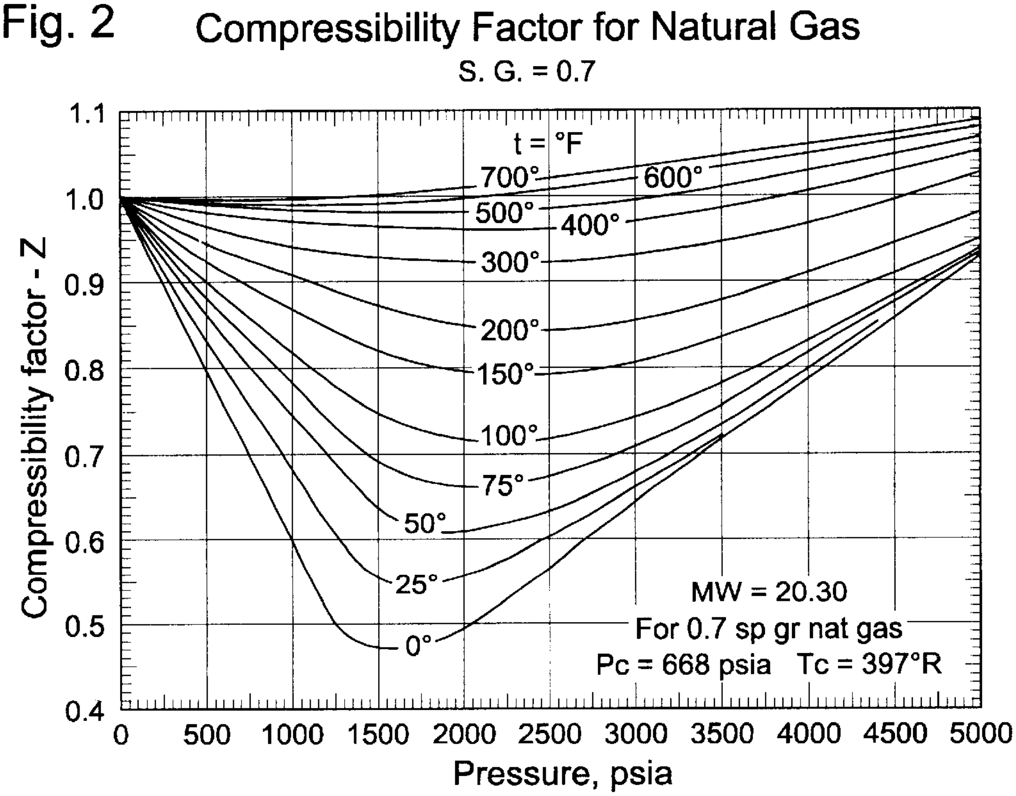
FIG. 2 is a graph of gas compressibility factor versus gas pressure for a gas with a specific gravity of 0.7.

Another example gas composition is illustrated in FIG. 2 showing a graph of the compressibility factor Z versus gas pressure for a gas with a specific gravity of 0.7. The values for Z were obtained in the same manner as FIG. 1. The temperatures of the gas displayed in FIGS. 1 and 2 go no lower than 0° F. FIG. 3 illustrates the compressibility factor for gasses of 0.6 and 0.7 specific gravity as the temperature decreases below 0° F. Now referring to FIG. 3, looking at Z versus P for a 0.7 specific gravity gas, the minimum value of Z is 0.403 and is found in the neighborhood of 1350 psia at −20° F. Thus, for the 0.7 specific gravity gas, the storage components are designed for at least 1350 psia, plus any applicable safety margin. These conditions produce a compression ratio of approximately 268. FIG. 3 also illustrates how compressibility increases as the gas temperature is reduced to even colder temperatures. For a 0.7 specific gravity gas at −30° F. a minimum value of Z is 0.36 at about 1250 psia. For the same gas at a temperature of −40° F., the value of Z decreases to 0.33 at 1250 psia. At pressures below 1250 psia liquids will begin to dropout of the 0.7 specific gravity gas at −40° F. and it will no longer be a dense phase gas.

Figure 3A:
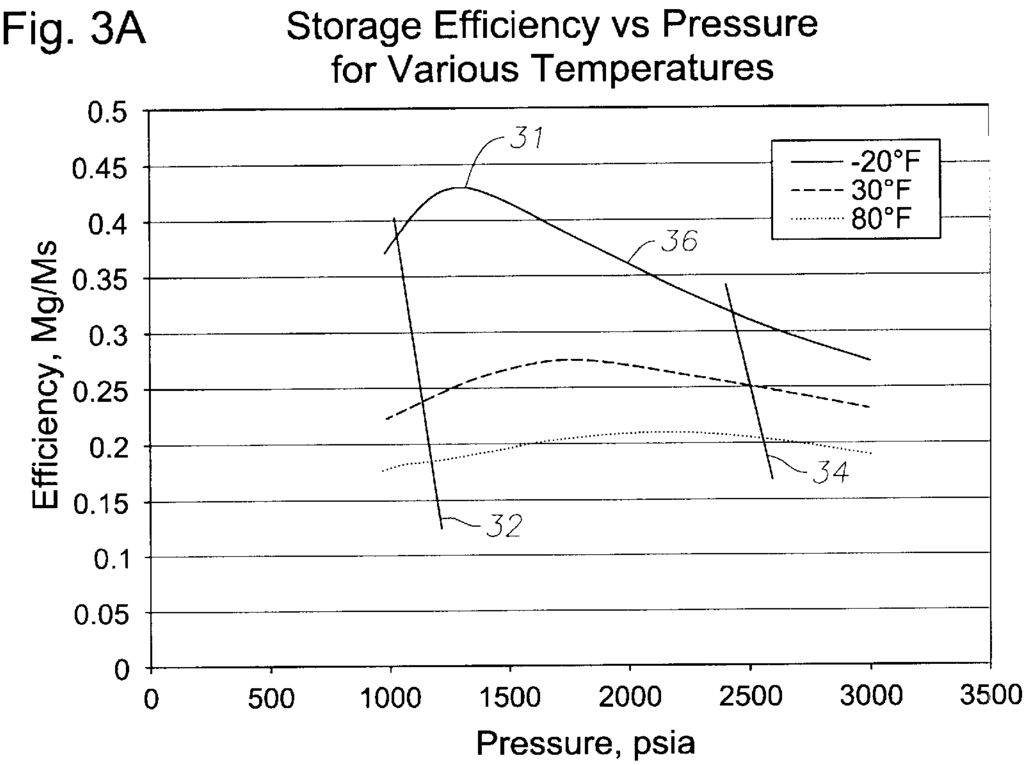
FIG. 3A is a graph of the efficiency of the gas storage system versus storage pressure at varying operating temperatures.

A key objective, and benefit, of the present invention is to increase the efficiency of gas storage systems. Specifically to maximize the ratio of the mass of the gas stored to the mass of the storage system. FIG. 3A, shows the relationship between the pressure at which the gas is stored and the efficiency of the system for various temperatures. It can be seen in FIG. 3A that, at a given pressure, as the temperature of the gas decreases, the efficiency of the storage system increases. While it is preferred that the system of the present invention be operated at the point 31 that will maximize efficiency, it is understood that this may not be practical in all instances. Therefore, it is also preferred to operate the system of the present invention within a range of efficiencies, such as that illustrated on FIG. 3A, and delineated by line 32 and line 34. It is also preferred that the present invention operate with efficiencies exceeding 0.3.

Still referring to FIG. 3A, the preferred operating parameters for one embodiment of the present invention is represented by curve 36. This curve is representative of a gas, having a specific composition, being stored at −20° C. It is understood that as the composition of the gas varies the curve will also differ. Although it is possible, and advantageous over the prior art, that the gas may be stored at any pressure falling within the range represented, it is preferred that the gas be stored at a pressure in the range defined by curves 32 and 34. Therefore, a storage system constructed in accordance with this embodiment of the present invention should be capable of storing gas at any pressure defined by this range, nominally between 1100 and 2300 psi, and at −20°.

A method for optimizing a gas payload includes: 1) selecting the lowest temperature for the storage system considering an appropriate margin of safety, 2) determining the optimum conditions for the compression of the particular composition gas in question at that temperature, and 3) designing appropriate gas containers, such as pipe, to the selected temperature and pressure, e.g. select pipe strength and wall thickness.

It would be preferred that the system of the present invention be utilized to store and transport a gas of known, constant composition. This allows the system to be perfectly optimized for use with the particular gas and allows the system to always operate at peak efficiency. It is understood that the composition of a gas can vary slightly over time for a particular producing gas reservoir. Similarly, the gas storage and transportation system of the present invention may be utilized to service a number of reservoirs producing gases of varying composition with a range of specific gravities.

The present invention can accommodate these variances. FIG. 3 is a view of the −20° F. curves for 0.6 and 0.7 specific gravity gases. The value of Z for the 0.7 specific gravity gas has a variance of Z of less than 2% over a pressure range of about 1200 to 1500 psia at −20° F. The 0.7 specific gravity gas maintains a 2% variance from about 1150 to 1350 psia at −30° F., and the variance from 1250 to 1350 psia at −40° F. Thus, depending on the temperature of the system, the design of the storage components may be considered optimum over a range of pressures for which the compressibility factor is minimized or within this 2% variance. It is preferred to operate within this variance range but it is understood that other storage conditions may find utility in certain situations.

Although reference will be made to the use of the system of the present invention with a gas of a particular composition, it is understood that this particular composition may not be the composition actually produced from the reservoir and a system designed for use with gas of a particular composition is not limited to use solely with a gas of that particular composition. For example, decreasing the temperature slightly will allow commercial quantities of leaner gas to be stored in a containment system optimized for a rich gas.

For the gas storage containers, the preferred embodiment will use a high strength steel of at least 60,000 psi yield strength, i.e., X-60 steel. The storage component is preferably steel pipe, although other materials, including, but not limited to, nickel-alloys and composites, particularly carbon-fiber reinforced composites, may be used. Any pipe diameter can be used, but a larger diameter is preferred because a larger diameter decreases the number gas containers required in a system of a given capacity, as well as decreasing the amount of valving and manifolding needed. Large diameter pipe also allows repairs to be carried out by methods using means of internal access, such as securing an internal sleeve across a damaged area. Large diameter pipe also allows the inclusion of a corrosion, or erosion, allowance to improve the useful life of the storage container with only a minimal affect on storage efficiency. Very large pipe diameters, on the other hand, increase the wall thickness required and are more subject to collapse and damage during construction. Therefore, a pipe diameter is preferably chosen to balance the above described concerns, as well as availability and cost of procurement. According to one embodiment of the present invention, a pipe diameter of 36 inches is used.

The preferred pipe is mass produced pipe and is quality controlled in accordance with applicable standards as published by the appropriate regulatory agencies. Initial discussions with certain regulatory agencies indicate that, although no applicable code of standards or regulations exist with respect to the use of such pipe as a gas container in a marine transportation application, the use of a maximum design stress of 0.5 of yield strength, or 0.33 of ultimate tensile strength, whichever is lower, is appropriate. This is a significant improvement over the prior art in that the normal special built storage tank construction used in some prior art methods requires a maximum design stress of 0.25 of yield strength. A design factor of 0.5 means that the structure must be designed twice a strong as required and a 0.25 factor means that the structure must be 4 times as strong. Thus the present invention can meet regulatory and safety requirements while using less steel, and thereby significantly reducing capital costs. Another advantage of the present invention is the margins of safety and levels of quality control that are inherent to mass produced, premium grade pipe.

The preferred embodiment is designed for a gas temperature of −20° F. as the temperature where the gas can be maintained in the dense, phase at the storage pressure targeted. As previously discussed, standard carbon steel is widely accepted for use at temperatures as low as −20° F., while the high strength steel used in premium pipe is accepted for use at temperatures as low as −60° F. This gives a wide margin of safety in the operating temperature of the gas storage system as well as providing some flexibility in its use at temperatures below the design temperature. A further consideration is that the heavier hydrocarbons that contribute to a low Z value do not drop out when the gas is chilled to −20° F. because the gas is in the "supercritical" state, i.e., dense phase. Separate phases for natural gas do occur once the gas drops to around 1000 psia. This can be allowed to happen, outside of the primary gas containment system, when the gas is off-loaded, if it is desired to collect the heavier hydrocarbons such as ethane, propane and butane, which can have higher economic value, but is not preferred during storage and transportation.

As discussed above, the preferred embodiment uses a high strength steel for the pipe, i.e., at least 60,000 psi yield strength, and the calculations below assume that the design factor of 0.5 of the yield stress controls. The following is a calculation of the preferred wall thickness for the pipe.

Initially the mass of gas carried per mass of the gas containing pipe is maximized without regard to the other components such as the support structure, insulation, refrigeration, propulsion, etc. The mass of gas, mg that is contained in the pipe per unit length can be written as $$m_g = \frac{p_g V_g}{ZRT_g} \tag{2}$$

where $p_g$ is the gas pressure, $V_g$ is the volume of the container, Z is the compressibility factor, R is the gas constant and $T_g$ is the temperature. This mass of gas is contained in one foot length of pipe with a diameter of $D_i$ is given by $$\frac{m_g}{\text{ft. pipe}} = \frac{p_g}{ZRT_g}\frac{\pi D_i^2}{4}. \tag{3}$$

In order to maximize the efficiency of the storage system, as defined by the ratio of the mass of the gas to the mass of the storage container ($m_g/m_s$), the pipe should be as light weight as possible. The hoop stress P of a thin walled cylinder is defined as $$P = \frac{2SF}{D_i}\frac{D_o - D_i}{2} \tag{4}$$

where S is the yield stress of the pipe material, F is the design factor from Table 841.114A of the ASME B31.8 Code (assumed to be 0.5 for this case), and $D_o$ is the outer diameter of the pipe. Therefore, substituting in equation 4 and using an F of 0.5, the mass of the pipe ($m_s$) can be calculated by $$m_s = \rho_s\frac{\pi}{4}(D_o^2 - D_i^2) = \frac{\rho_s\pi}{2}(D_o + D_i)\left(\frac{D_i P}{S}\right) \tag{5}$$

where $p_s$ is the density of the pipe material. Combining equations 2 and 5 the ratio ψ of the mass of gas $m_g$ to mass of storage system $m_s$ is can be represented by $$\Psi = \frac{m_g}{m_s} = \frac{S}{2\rho_s ZRT_g}\frac{D_i}{(D_o + D_i)} \tag{6}$$

This function was evaluated numerically for the following set of parameters:

| | | |
|---|---|---|
| S | 60 to 100 | ksi |
| F | 0.5 | — |
| R | 96.4 methane | lbf.ft/(lbm.R) |
| | 88.91 natural gas (S.G. = 0.6) | |
| $T_g$ | 439.69 | R |
| $\rho_s$ | 490 | lbm./ft3 |

Figure 4:
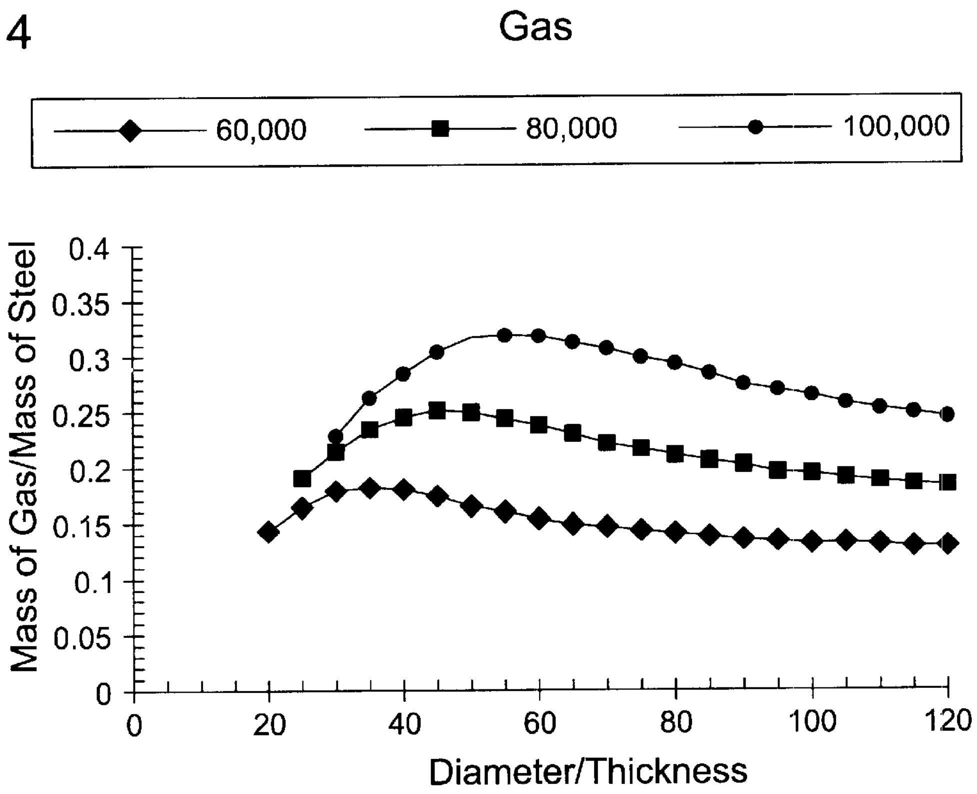
FIG. 4 shows how the ratio of the mass of the gas per mass of steel varies with the ratio of the diameter per thickness of the pipe when based on the optimized compressibility factor for a specific gravity gas.

The above referenced function, ψ is easily evaluated numerically and is shown in FIG. 4 for three different yield stress values of S for gas. For ease of analysis the efficiency function ψ can be analyzed in relation to the ratio of diameter of the pipe to the thickness of the pipe as represented by $$\frac{D}{t} = \frac{D_i}{.5(D_o - D_i)} \tag{7}$$

FIG. 4 shows how the ratio of the mass of the gas per mass of pipe material (defined as the efficiency) varies with the ratio of the diameter to thickness of the pipe. This type of curve is used when choosing the optimum D/t or maximum efficiency ψ as discussed above. As can be seen in FIG. 4, the maximum of ψ occurs at different D/t for different yield stress values; these maxima are tabulated below for materials of different yield stress.

| Yield Stress (S) | Methane | | Natural Gas | |
|---|---|---|---|---|
| ksi | D/t | ψ max | D/t | ψ max |
| 60 | 30 | 0.152 | 35 | 0.18 |
| 80 | 40 | 0.208 | 46 | 0.25 |
| 100 | 50 | 0.265 | 57 | 0.316 |

The efficiency increases dramatically as S increases and thus it is prudent to choose the material with a high maximum yield stress, such as around 100,000 psi. For this value of the yield stress, the maximum efficiency occurs at a D/t of about 50 and is approximately 0.316 for the gas and 0.265 for the methane. But this still does not indicate the exact pipe selection; however, if D is fixed based on availability, or other considerations, the necessary wall thickness can be determined immediately. Selecting a diameter D=20 in, as an example, the wall thickness should be 0.375 in. This is a standard size and therefore is readily available; for this pipe, D/t=53.3 and the mass of gas/mass of steel is found to be 0.315, which is close to the optimum selection. The weight of this pipe is 78.6 lb/ft; the weight of the pipe with the gas is 102.79 lb/ft. The pressure of the gas at this optimum configuration is 1840 psi. Note that if the 100 ksi material is not available, or if criteria on ultimate strength limits is applicable, other optimum D/t can be selected based on material availability, but the ratio of mg/ms will not be as high as for the 100 ksi material. Although a 20 inch pipe diameter is used here as an example, other sizes such as the 36 inch diameter pipe discussed earlier are also valid.

While the above example uses the maximum yield stress as the critical factor in choosing a material, it is understood that, when considering the applicable codes and regulations, other material properties and design factors may also be important. For example, as previously discussed, certain regulatory bodies require that the maximum principal stress not exceed 0.33 of the ultimate tensile strength of the material, thereby making the ultimate tensile stress a critical selection factor. In low temperature service, regulatory bodies also require a certain toughness characteristic of the material, as typically determined by a Charpy V-notch impact test, so that low temperature performance of the material becomes important. Also, note that additional stresses might arise due to bending caused by self weight, marine vessel flexure, and thermal stresses, and although these are orthogonal to the hoop stress on which the above calculation is based, these stresses may also become an important design consideration based on the particular application.

Other design considerations also may be considered when selecting a suitable gas container and storage system. For example, since the operating stress is above 40% of the specified minimum yield stress, according to ASME B31.8 Code, Section 841.11 c, the selected material should be subjected to a crack propagation and control analysis—assuring adequate ductility in the pipe and/or providing mechanical crack arrestors. Note that the pipe supports can be designed to double as crack arrestors. Additionally, the calculations thus far have been concerned only with the gas and the pipe to contain it; however, these pipes have to be stacked in a structural framework, disposed on the marine vessel, provided with manifolds, pumps, valves, controls etc. for on-loading and off-loading operations, and provided with insulation and refrigeration systems for chilling and maintaining the gas at a reduced temperature. The pipes used as gas containers must also be able to resist the loads created by other gas containers and the additional equipment The preferred embodiment includes a 36 inch diameter pipe and a D/t ratio of 50. Once the diameter and D/t ratio have been selected, then the wall thickness is determined. The compressibility factor for the gas, of course, has been included in the calculation of the ratio. Thus, in the design for a gas with a certain composition at −20° F., the equation of state calculates a preferred pressure for the compressed gas. Knowing that pressure, this provides the best compressibility factor. Thus the pipe is designed for this optimum compressibility factor at −20° F. The equation for pressure and wall thickness is then used knowing the pressure, to calculate the wall thickness for the pipe at a given diameter.

Thus, the design of the pipe is made for the pressures to be withstood at −20° F. considering the particular composition of the gas. However, there is a relatively flat area on the curve where the optimum Z factor is obtained. Thus, as shown in FIG. 3, the design pressure can be between about 1,200 and 1,500 psia, for a 0.7 specific gravity gas, without a significant variance in the compressibility factor. This allows flexibility in the composition of gas that can be efficiently transported in the gas storage system of the present invention.

It is preferred that the gas container design be optimized because of the production and fabrication costs of the storage system, as well as a concern with the weight of the system as a whole. If the gas containers are not designed for the composition of gas at −20° F., the gas containers may be over-designed, and thus be prohibitively expensive, or be under-designed for the pressures desired. The preferred embodiment optimizes the gas container design to achieve the efficiency of the optimum compressibility of the gas. The efficiency is defined as the weight of the gas to the weight of the pipe used in fabricating the gas container. In a preferred embodiment for a 0.7 specific gravity gas, an efficiency of 0.53 can be achieved when using a pipe material having a yield strength of 100,000 psi. Thus, the weight of the contained gas is over one-half the weight of the pipe.

The optimum wall thickness for a given diameter pipe may or may not coincide with a wall thickness for pipe that is typically available. Thus, a pipe size for the next standard thickness for a pipe at that given diameter is selected. This could lower efficiency a little bit. The alternative, of course, is to have the pipe made to specific specifications to optimize efficiency, i.e. the cost of the pipe for a particular composition of natural gas. It would be cost effective to have the pipe built to specifications if the quantity of pipe needed to supply a fleet of marine vessels was great enough to make the manufacture of special pipe economical.

Using the equations discussed above, the wall thickness of the pipe can be calculated for storing a gas at established conditions. For storing a 0.6 specific gravity gas at 1825 psia using a 20 inch diameter pipe with an 80,000 psi yield strength, the wall thickness is in the range of 0.43 to 0.44 inches and preferably 0.436. For a pipe diameter of 24 inches the wall thickness is in the range of 0.52 to 0.53 and preferably 0.524 inches. For a pipe diameter of 36 inches, the wall thickness is in the range of 0.78 to 0.79 and preferably 0.785 inches.

For storing a 0.7 specific gravity gas at 1335 psia using a 20 inch diameter pipe with an 80,000 psi yield strength the wall thickness is in the range of 0.32 to 0.33 inches and preferably 0.323. For a pipe diameter of 24 inches the wall thickness is in the range of 0.38 to 0.39 and preferably 0.383 inches. For a pipe diameter of 36 inches, the wall thickness is in the range of 0.58 to 0.59 and preferably 0.581 inches.

The PB-KBB report, hereby incorporated herein by reference, describes another method of calculating pipe diameters and thickness for storing gases of given specific gravities. For 0.6 specific gravity natural gas with a pipe diameter of 24 inches, the wall thickness for a design factor of 0.5 is in the range of 0.43 to 0.44 inches and preferably 0.438 inches and for a 20 inch pipe diameter, the wall thickness is in the range of 0.37 to 0.38 inches and preferably 0.375 inches, for a pipe material having a yield strength of 100,000 psi. For 36 inch diameter pipe, the wall thickness is in the range of 0.48 to 0.50 inches and preferably 0.486 inches for a gas with a 0.7 specific gravity and is in the range of 0.66 to 0.67 inches and preferably 0.662 inches for a gas with a 0.6 specific gravity, for a pipe material having a yield strength of 100,000 psi.

The thickness ranges described above do not include any corrosion or erosion allowance that may be desired. This allowance can be added to the required thickness of the storage container to offset the effects of corrosion and erosion and extend the useful life of the storage container.

Vessel Design and Construction

Natural gas, both CNG and LNG, can be transported great distances by large cargo vessels or freighters. In one embodiment of the present invention, the gas storage system is constructed integral with a new construction marine vessel. The marine vessel can be any size, limited by the usual marine considerations and economies of scale. For purposes of example, the storage system may be sized to carry between 300 and 1,000 million standard cubic feet of gas, i.e., 0.3 and 1.0 billion standard cubic feet (BCF), at standard conditions, 14.7 psi and 60° F. An ocean-going marine vessel sized to carry this exemplary system can include gas containers constructed using 500 foot lengths of pipe. In general, the length of the pipe will be determined by the cargo size and the need to keep proper proportionality between vessel length, depth and beam.

To determine the interior volume of pipe required on a marine vessel, equation (1) above, is solved using a known mass of the gas, compressibility factor, gas constant, and the selected pressure and temperature. For example at the preferred storage conditions, 1.1 million cubic feet of interior pipe space is required to contain 300 million standard cubic feet of gas. In the case of 20 inch diameter pipe, 100 miles of pipe is required in the vessel. If the pipe had a 36" diameter, the total length of the pipe would be approximately 32 miles. One example of the preferred dimensions for a marine vessel, constructed in accordance with the present invention, is a length of 525 feet, a width of 105 feet and a height of 50 feet.

Once the pipe parameters have been determined for the particular gas to be transported, the vehicle or vessel for the gas can now be designed and constructed taking into account the considerations heretofore mentioned. The vessel is preferably constructed for a particular gas source or producing area, i.e., pipe and vessel are designed to transport a gas produced in a given geographic area having a particular known gas composition. Thus, each vessel is designed to handle natural gas having a particular gas composition.

The composition of the natural gas will vary between geographic areas producing the gas. Pure methane has a specific gravity of 0.55. The specific gravity of hydrocarbon gas could be as high as 0.8 or 0.9. The composition of the gas will vary somewhat over time even from a particular geographic area. As mentioned above, the compressibility factor can be considered optimum over a range of pressures to adjust for slight variations in the composition. However, if a field has a variance that falls outside the range of a particular compressibility factor, heavier hydrocarbons may be added to or removed from the gas to bring the composition into the design range of the particular vessel. Thus, a vessel designed to a particular composition gas being produced can be made more commercially flexible by adjusting the hydrocarbon mix of the gas. The specific gravity can be increased by enriching the gas by adding heavier hydrocarbons to the produced gas or decreased by removing heavier hydrocarbon products. Such adjustments may also be made for different gas fields with different compositions.

For a particular ship to handle gas with different specific gravities, a reservoir of adjusting hydrocarbons may be maintained at the facility to be added to the natural gas thereby adjusting the composition of the natural gas so that it may be optimized for loading on a particular vessel which has been designed for a particular composition gas. Hydrocarbons can be added to raise the specific gravity. The reservoir of hydrocarbons may be located at the particular port where the natural gas is on-loaded or off-loaded.

For example, suppose natural gas having a specific gravity of 0.6 is to be loaded on a vessel designed for gas having a specific gravity of 0.7. Propane may be acquired and mixed, at approximately 17% by weight, with the 0.6 natural gas, creating an enriched gas that is loaded onto the vessel. Then when offloading, as the enriched gas expands and cools, the propane will drop out because it will liquefy. That propane could then be put back onto the vessel and used again at the original on-loading port. The capacity to transport natural gas is increased by 41% due to adding propane to the 0.6 specific gravity natural gas. Thus, transporting the propane back and forth can be cost effective. Having a reservoir of propane to adjust the specific gravity of the natural gas may well be more cost effective as compared to building a new vessel just to handle 0.6 specific gravity natural gas. It may also prove cost effective to use the vessel at conditions different from the optimum conditions for which the system was designed.

In one embodiment of the present invention, the pipe for the compressed natural gas is used as a structural member for the marine vessel. The pipe is attached to the bulkheads which in turn are attached to the marine vessel's hull. This produces a very rigid structural design. By using the pipes as a part of the structure the amount of structural steel normally used for the vessel is minimized and reduces capital costs. A bundle of pipes together is very difficult to bend, thus adding stiffness to the vessel. A preliminary design indicates that a marine vessel, built with an integral pipe structure, and having an overall length of over 500 feet, would only deflect about 2 or 3 inches. It is desirable to limit bending deflection because it places wear and tear on the pipe and ship. Bending deflection is defined as deviation from a horizontal straight line.

Figure 6:
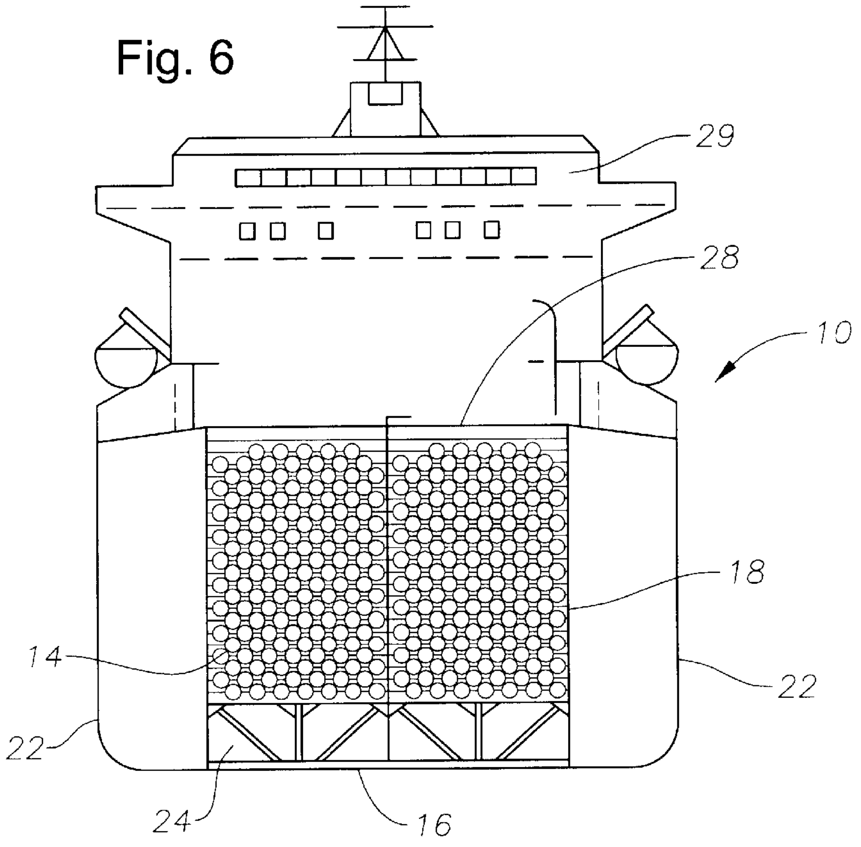
FIG. 6 is a cross sectional view of the width of the vessel shown in FIG. 5 in accordance with the present invention showing the bulkhead of FIG. 7.
Figure 5:
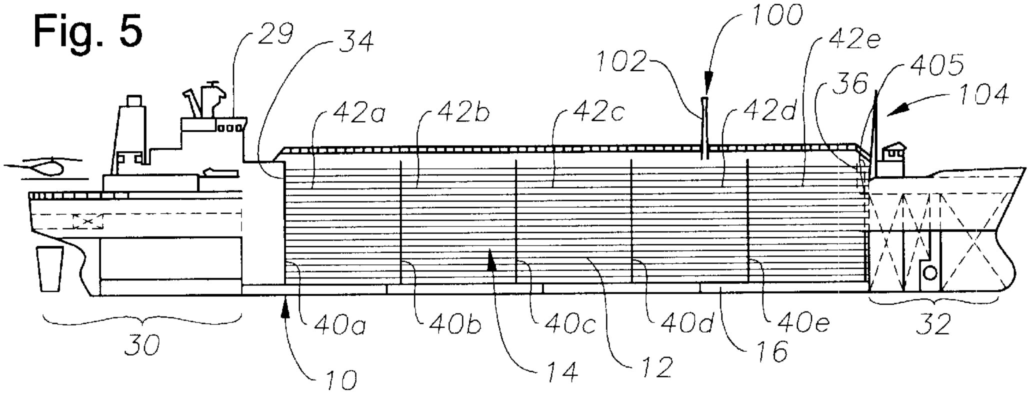
FIG. 5 is a cross sectional view of the length of a vessel in accordance with the present invention showing the bulkhead compartments of the vessel with gas storage pipe.
Figure 7:
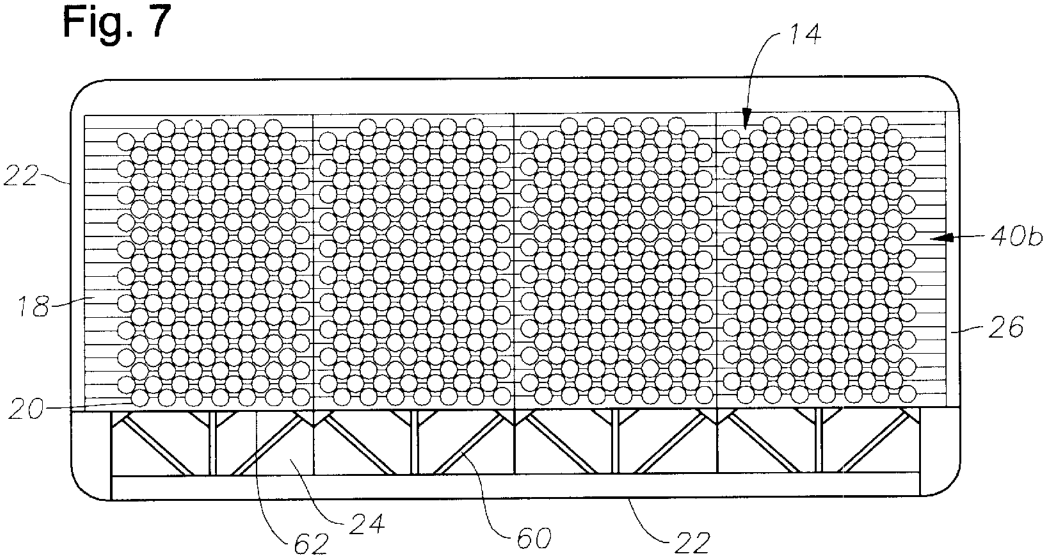
FIG. 7 is a cross sectional view of the hull of the vessel of FIG. 5 in accordance with the present invention showing a bulkhead of cross beams and gas storage pipe.

Referring now to FIGS. 5, 6 and 7, there is shown a marine vessel 10 built specifically for the preferred pipe 12 designed to transport a particular gas having a known composition to be on-loaded at a particular site. As for example, the pipe may be 36" diameter pipe having a wall thickness of 0.486 inches for transporting natural gas produced in Venezuela and having a specific gravity of 0.7. The pipe 12 forms part of the hull structure of the marine vessel 10 and includes a plurality of lengths of pipe forming a pipe bundle 14 housed within the hull 16 of the vessel 10. It should be appreciated, however, that the pipe may be housed in other types of vehicles or marine vessels without departing from the invention. A ship may be preferred because it will travel at a faster speed than a barge, for example.

Cross beams 18 are used to support individual rows 20 of pipe 12 and to form part of the structure of the marine vessel 10. Cross beams 18 extend across the beam of the marine vessel 10 to provide the structural support for the hull 16. The perimeter 22 shown in FIG. 7 with the bundle of pipes 14 represents the hull 16 of the marine vessel 10. The plate that forms the hull 16 around the marine vessel 10 is not the expensive part of the marine vessel 10. Thus, marine vessel 10 is built using the cross beans 18 to hold the individual pieces of pipe 12. The bundle of pipes 14 has a cross section which conforms to the cross section of the hull 16 of the marine vessel 10. Therefore, rather than be in a rectangular cross-section, such as on a barge, the bundle of pipes 14 on the marine vessel 10 may have a generally triangular cross section or a cross section forming a trapezoid. The top of the pipe bundle 14 is flat since it is located just underneath the deck 28 of the marine vessel 10.

FIG. 5 shows that the pipe bundle 14 extends nearly the full length of the marine vessel 10. It should be appreciated that the marine vessel 10 includes the other standard parts of a ship. For example, the stern 30 may include the crews quarters and the engine. Also there is space 32 in the bow of the marine vessel 10. It should also be appreciated that there will be space adjacent the stern end 34 and bow end 36 of the pipes 12 for manifolding and valving, hereinafter described, as well as room to manipulate the valving and manifolding. All that is required is that sufficient space is left in the stern for the engines for the marine vessel 10. The deck 28 and pilot house 29 extend above the pipe bundle 14.

The cross beams 18 not only support the pipe 12 but, together with the pipe bundle 14, can also serve as a bulkhead 40 within the marine vessel 10. In the preferred embodiment, bulkheads 40 are spaced every 60 feet but this may vary depending on pipe weight and marine vessel design. Thus there would be roughly nine bulkheads 40 in a marine vessel 10 using pipe having a length of 500 feet. The number of bulkheads in the present invention is consistent with the regulations of the United States Coast Guard. The bulkheads 40 cannot leak from one compartment 42 to another compartment 42 in the marine vessel 10. For example, if the marine vessel 10 were to be ruptured in one compartment 42 created by a pair of bulkheads 40, water is not allowed to pass from one compartment 42 to another. Thus, the bulkhead 40 seals off adjacent compartments 42 of the marine vessel 10.

Encapsulating insulation 24 extends around the bundle of pipes 14 in each compartment 42 and extends to the outer wall 26 formed by the hull 16 of the marine vessel 10. There is insulation along the bottom and around the bundle of pipes 14. The entire bundle 14 is wrapped in insulation 24. However, there is no insulation along the wall of the bulkhead 40 formed by the cross beams 18 since there is no reason to insulate one compartment 42 from another because the temperature is to remain constant in all compartments 42. Insulation is required to limit the temperature rise of the gas during transportation. A preferred insulation is a polyurethane foam and is about 12–24 inches thick, depending on planned travel distance. However, the insulation 24 adjacent the ocean will have a greater heat transfer and may require a slightly thicker insulation. When the entire bundle of pipes 14 is wrapped in insulation 24, the temperature rise may be less than ½° F. per thousand miles of travel. Thus, the resulting pressure increase in the pipes is far less than the decrease due to the amount of gas used from gas storage in the operation of the marine vessel 10.

Figure 8:
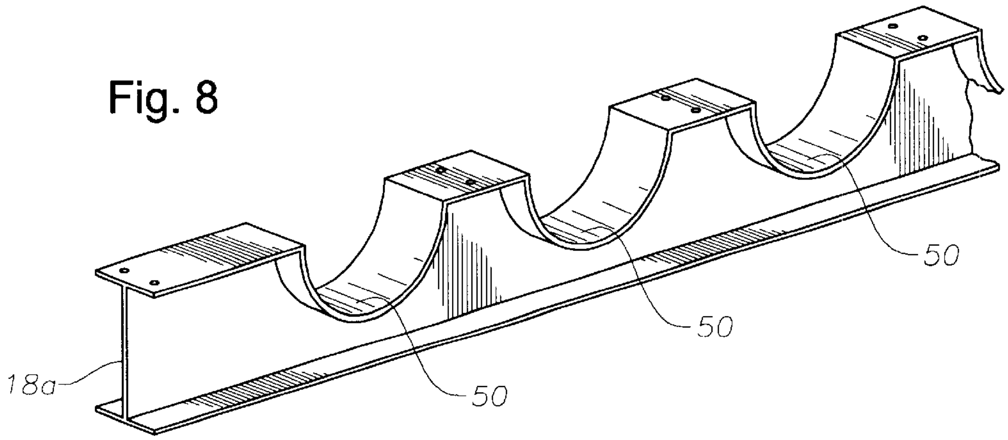
FIG. 8 is a perspective view of one embodiment of a pipe support system showing a base cross beam support for supporting gas storage pipe shown in FIG. 7.
Figure 9:
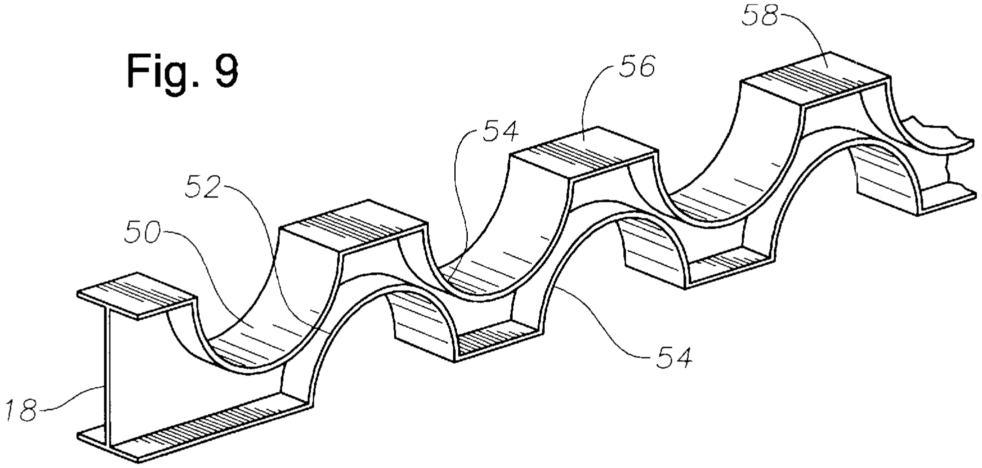
FIG. 9 is a perspective view of a standard cross beam of the pipe support system of FIG. 8 for supporting and torquing down gas storage pipe shown in FIG. 7.
Figure 10:
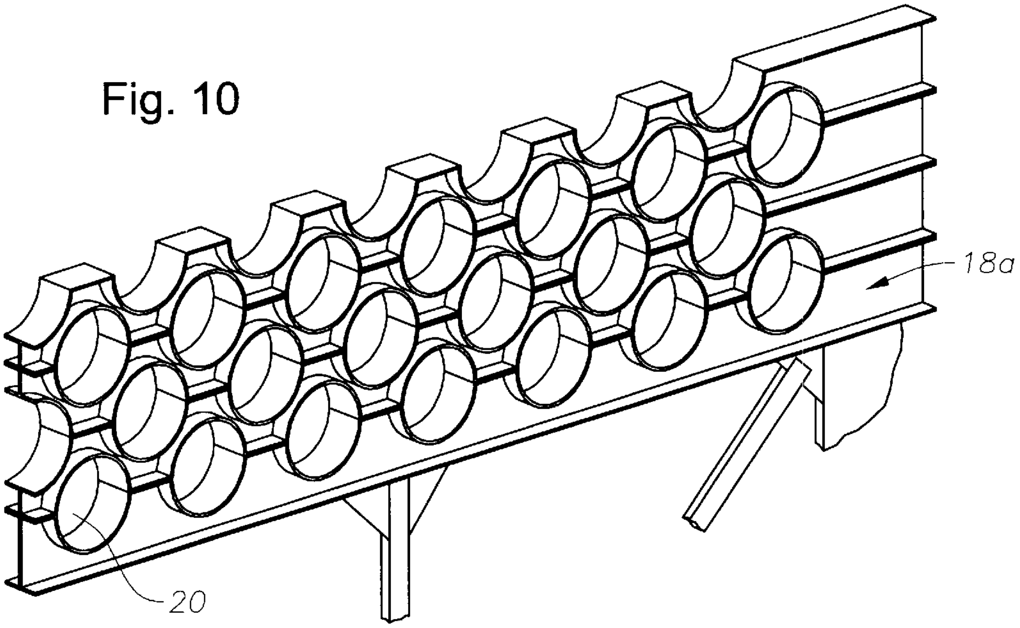
FIG. 10 is a perspective view of the bulkhead shown in FIG. 7 being constructed in accordance with the present invention.

As shown in FIG. 7, the pipes 12 housed between crossbeams 18 form pipe bundles 14. The pipe 12 is laid individually onto cross beam 18 to form pipe rows 20, shown in FIG. 8. FIGS. 8–10 show one embodiment of cross beams 18. Bottom cross beam **18*a* shown in FIG. 8 is a bottom or top cross beam while FIG. 9 shows the typical intermediate cross beam 18 having alternating arcuate recesses forming upwardly facing saddles 50 and downwardly facing saddles 52 for housing individual lengths of the pipe 12. A coating or gasket 54 lines each saddle 50, 52 to seal the connection between adjacent saddles 50, 52 in order to create the watertight bulkhead walls 40. One embodiment includes a Teflon™ sleeve or coating to serve as the gasketing material. It should also be appreciated that a gasketing material 56 may be used to seal between the flat portions 58 of cross beams 18. The pipes 12 resting in the mated C-shaped saddles 50, 52** create a sealable connection.

Cross beams 18 are preferably I-beams. An alternative to using an I-beam is a beam in the form of a box cross section formed by sides made of flat steel plate. The box structure has two parallel sides and a parallel top and bottom. Saddles 50, 52 are then cut out of the box structure. The box structure has more strength than the I-beam. However, the box structure is heavier and more difficult to manufacture.

The individual pipes 12 are received in the upwardly facing saddles 50 and, after a row 20 of pipes 12 is installed, a next cross beam 18 is laid over row 20 with the downwardly facing saddles 52 receiving the upper sides of the pipes 12. Once the pipe 12 is housed in mating C-shaped, arcuate saddles 50, 52 of two adjacent cross beams 18, the cross beams 18 are clamped together and connected to each other. FIGS. 7 and 10 shows the beams 18 stacked to form a bulkhead wall 40.

There are two methods for securing the pipe 12 between the cross beams 18 to form bulkheads 40, one is welding the pipe 12 to the cross beams 18 to make the entire bundle rigid and the other is to bolt the adjacent cross beams and allow the pipe 12 to move through the bulkhead 40. Because the compressed natural gas is to be maintained at a temperature of −20° F., the pipe 12 is installed at a temperature of 30° F. For a pipe length of 500 feet, the strain over that temperature difference is only about an inch from the middle of the pipe 12 to one of the free ends of the pipe 12. Thus, if the temperature of the pipe 12 goes from 30° F. to 80° F., there is a 1 inch expansion from the mid-point to the free end of the pipe 12.

Due to the relatively small expansion with respect to the length of pipe 12, neither welding or torquing suffer any expansion problems. Therefore in welding the cross beams 18, when the pipe 12 cools down, the strain is taken in the pipe 12 and in the bulkheads 40 formed by the cross beams 18. Alternatively, if the pipe 12 is not welded to the cross beams 18, the pipe 12 is laid in the cross members 18 in compression and then it is torqued down. The cross beams 18 are bolted together, securing the individual pieces of pipe 12. This provides a frictional engagement between the pipe 12 and the cross beams 18, and the pipe 12 is allowed to expand and contract with the temperature. For non-welded connections, it is preferred that some friction reducing material be present in the bulkhead saddles either as a coating or an inserted sleeve to relieve some of the friction. One such example is a Teflon™ coating.

Figure 11:
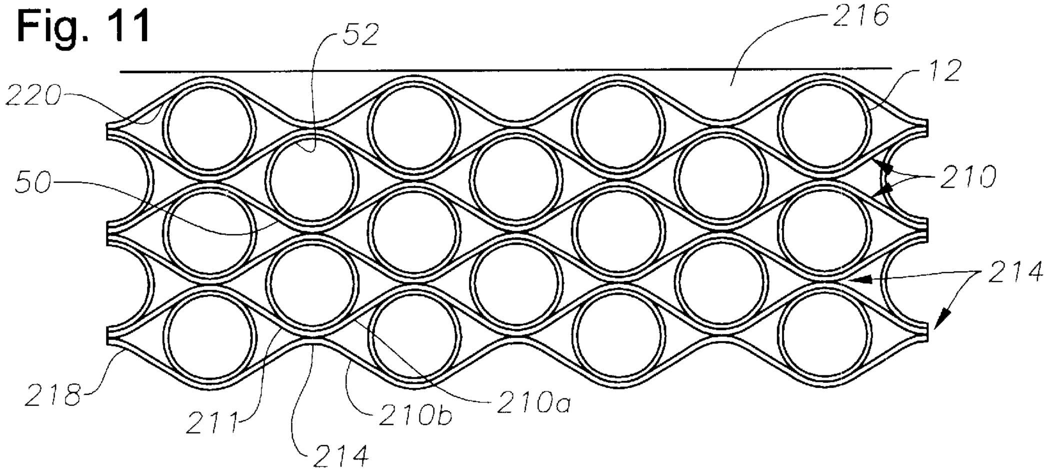
FIG. 11 is a cross sectional view of another embodiment of a pipe support system.

Referring now to FIG. 11, another embodiment of a pipe support system is illustrated. This embodiment uses straps 210 formed from steel plate so as to conform to the outside curvature of the pipes 12. The strap 210 is formed in a roughly sinusoidal pattern with a radius of curvature approximately equal to the outside diameter of the pipe 12 forming upwardly and downwardly facing saddles 50, 52 so the pipes 12 lay substantially side by side. The straps **210*a* are welded at contact points 214 to adjacent straps 210*b* creating an interlocked structure providing exceptional structural properties. One effect of the interlocked structure is that the Poisson's ratio of the entire structure 216 approaches one, therefore causing the stresses applied to the hull structure 16 to be absorbed laterally as well as vertically. Even though the use of straps 210** allow fewer pipes per tier, the tiers themselves are packed more tightly allowing a greater number of tiers and therefore the system includes more pipes per cross-sectional area of the system.

The straps 210 are preferably constructed from the same material as the pipes 12 are or from a similar material that is suitable for welding, or otherwise attaching, where the straps come into contact with each other. A preferred embodiment of the strap 210 is constructed from steel plate having a thickness of 0.6" with each strap being approximately 2' wide. In a configuration with 500' long lengths of pipe 210, ten straps 210 per pipe row are used at the lowest level 218 with the number of straps 210 per pipe row decreasing at higher levels to a minimum of six straps beneath the top tier 220. The number of straps 210 per tier decreasing with height is allowed because of the corresponding decrease in weight being supported by the straps. Spacers 239 can also be used where pipe spans become too long.

In this embodiment the pipes 12 are not welded to the straps 210 and are allowed to move independently. Because of this movement, the interface between the pipe 12 and the strap 210 is fitted with a low-friction or anti-erosion material 211 to prevent abrasion and smooth out any mismatches between the pipe 12 and the strap 210. Because each pipe is a buoyant, sealed compartment, additional watertight bulkheads are not required. A continuous sheet of material may be included between tiers to act as a barrier if a tier develops a leak. This continuous sheet could be integrated into the straps 210, and be constructed from metal or a synthetic material such as Kevlar™, or a membrane material.

The ends of the straps 210 are preferably rigidly connected to the marine vessel or container (not shown) containing the pipe bundle. The plurality of straps 210, and the supported pipes 12, contribute to the overall stiffness of the hull structure 16. The pipes 12 themselves are not welded to the straps 210 and therefore are allowed to bend, expand, and contract as required. It is preferred that each pipe 12 move independently of other pipes in response to the movement of the hull. This allows each pipe to move longitudinally in response to the stretching, bending, and torsion of the hull. Support for the weight of the pipe is provided both by the straps, which form an interlocking honeycomb structure, and the by the compressive strength of the pipe.

Manifold

Figure 12:
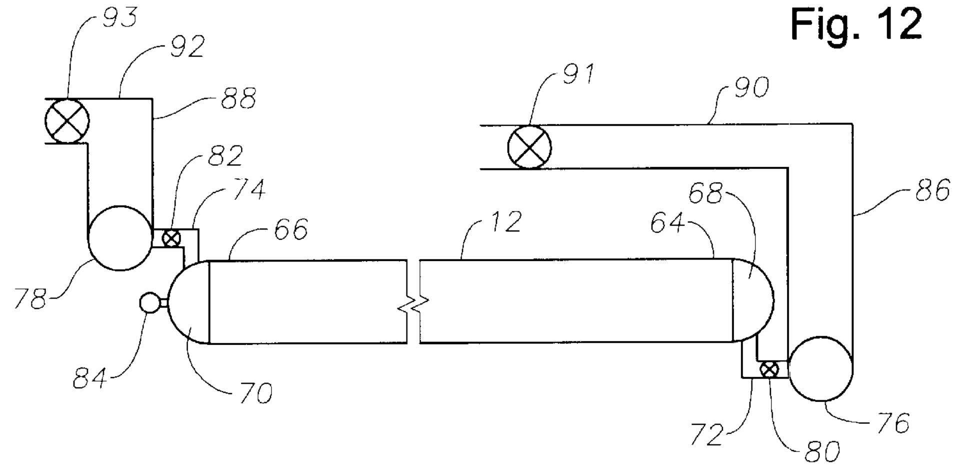
FIG. 12 is a schematic, partly in cross section, of a manifold system of the gas storage pipe of FIG. 7.

Referring now to FIG. 12, each of the ends 64, 66 of the pipes 12 are connected to a manifold system for on-loading and off-loading the gas. Each pipe end 64, 66 includes an end cap 68, 70, respectively. A conduit 72, 74 communicates with a column manifold 76, 78, respectively. In a preferred embodiment, the pipe ends 64, 66 are hemispherical and conduits 72, 74 are connected to caps 68, 70, respectively, which extend to a tier manifold.

Individual banks or tiers of pipes 12 communicate with a tier manifold 86, 88 at each end thereof. The plurality of pipes 12 which make up the tier may include any particular set of pipes 12. The tiers are principally selected to provide convenience in on-loading and off-loading the gas. For example, one tier manifold may extend across the top row 20 of pipes 12 such that the top row 20 of pipes 12 would form one tier. The outside rows 20 of pipes 12 may be manifolded into a separate tier in case of collision. The bottom rows 20 of pipe 12 may also be in a separate tier manifold. This allows the outside pipes 12 and bottom pipes 12 to be shut off. The other tiers of pipes may include any number of pipes 12 to provide a predetermined amount of gas to be on-loaded or off-loaded at any one time.

One arrangement of the manifold system may include tier manifold 86, 88 extending across the ends 64, 66, respectively, of the pipe 12 with tier manifolds 86, 88 communicating with horizontal master manifolds 90, 92, respectively, extending across the beam of the marine vessel 10 for on-loading and off-loading. Each tier of pipes has its own tier manifold with all of the column manifolds communicating with the master manifolds 90, 92 for on-loading and off-loading.

Horizontal manifolds have the advantage of keeping the marine vessel 10 in relative balance. Thus horizontal manifolds are preferred. One of the master manifolds 90, 92 is preferably in the stern and the other is preferably in the bow of the marine vessel 10 for simplicity of piping and conservation of space. To have all manifolds at one end of the marine vessel 10 is more complicated. One master manifold 90, 92 is used for an incoming displacement fluid for off-loading and the other master manifold 90, 92 is used as an outgoing manifold for offloading the compressed gas. The horizontal master manifolds 90, 92 are the main manifolds which extend across the marine vessel 10. The master manifolds 90, 92 are attached to shore system for on-loading and off-loading the gas. Master valves 91, 93 are provided in the ends of master manifolds 90, 92 for controlling flow on and off the marine vessel 10.

Construction Method

A system constructed in accordance with the present invention can be constructed in a variety of methods, several of which are presented here to illustrate the preferred methods of constructing pipe storage systems. A new marine vessel can be specially constructed to carry a storage system for CNG. In this embodiment the CNG system is integral to the structure and stability of the marine vessel. Alternatively, a CNG system can be constructed as a modular system functioning independently of the marine vessel on which it is carried. In yet another alternative an old marine vessel can be converted for use in transporting CNG where the structure of the CNG storage system may or may not be an integral component of the marine vessel's structure.

Referring now to FIGS. 5–7, in constructing a new marine vessel 10, the hull 16 is laid in dry dock and a base structure 60 is installed on the bottom hull 16 with a base plate 62 for each bulkhead 40, such as bulkhead **40*b* shown in FIG. 7. Then the remainder of the bulkhead 40*b* is constructed on top of the base plate 62. A bottom beam 18*a*, such as shown in FIG. 8, or strap 210, such as shown in FIG. 11, is then laid and affixed onto each of the base plates 62 of each of the bulkheads 40, all of the bulkheads 40 being constructed simultaneously. Once the initial set of bottom cross beams 18*a* or straps 210 are in place on top of the base bulkhead structure 60, then individual completed lengths of pipe 12 are lowered by cranes and laid in the upwardly facing saddles 50 formed in beams 18 or straps 210. Once the entire initial row 20 of pipes 12 have been laid on the initial set of bottom cross beams 18*a* or straps 210, then a set of cross beams 18, such as shown in FIG. 9, or straps 210 are laid and installed on top of the initial row 20 of pipes 12 with the downwardly facing saddles 52 receiving the individual pipes 12 in row 20 thereby capturing each of the individual lengths of previously laid pipe 12 between the two cross beams 18, 18*a* or straps 210. The adjacent cross beams 18, 18*a* or straps 210** are then either welded or bolted together.

It is preferred that the pipe 12 be installed in the bulkhead 40 while the pipe 12 is at a temperature of 30° F., assuming that the cargo temperature will be −20° F. and the expected ambient outside temperature will be 80° F. Unless the marine vessel 10 is being built at a location where temperatures are already 30° F. and cooling the pipe is unnecessary, the pipe 12 is cooled by passing coolant through each piece of pipe 12 as it sits in the cross beam 18 or strap 210 but before it is fixed in place in the marine vessel 10. Nitrogen may be used as the coolant to cool the pipe to approximately 30° F. This causes the temperature of the pipe 12, when it is installed within the bulkheads 40 to be at a temperature of 30° F. so that expansion or contraction of the pipe 12 is limited to 1 inch as the temperature in the marine vessel 10 ranges from −20° F. to possibly as much as 80° F.

The cross beams 18 or straps 210 and rows 20 of pipe 12 are continually laid into the hull 16 of the marine vessel 10 until all pieces of pipe 12 are laid horizontally into the marine vessel 10 and the bulkheads 40 are all formed. The individual lengths of pipe 12 are affixed to the cross beams 18 or straps 210 after the pipe 12 has been laid inside the marine vessel 10. For the nominal design it is anticipated that there are approximately 500 lengths of pipe 12 laid in the marine vessel 10, each being approximately 500 feet long.

The 500 foot lengths of pipe 12 are preferably welded at a pipe manufacturing plant using plant machines to weld the pipe into 500 foot lengths. This is preferred because the quality of the welds are better in the plant as compared to field welding. The pipe 12 is also tested at the manufacturing plant before it is moved to the site of the construction of the marine vessel 10. The pipe 12 is transported on trolleys and individual pieces of pipe 12 are then set into the saddles 50 in the cross beams 18 or straps 210 mounted in the hull 16 of the marine vessel 10. Each of the rows 20 are individually filled with pipe 12 and the cross beams 18 or straps 210 are laid until the marine vessel 10 is completely filled with approximately 30 miles of 36" diameter pipe. After the pipe has been installed, the remaining hull and the deck 28 are then constructed over the pipe bundle 14 to enclose the compartment(s) 42.

Figure 13:
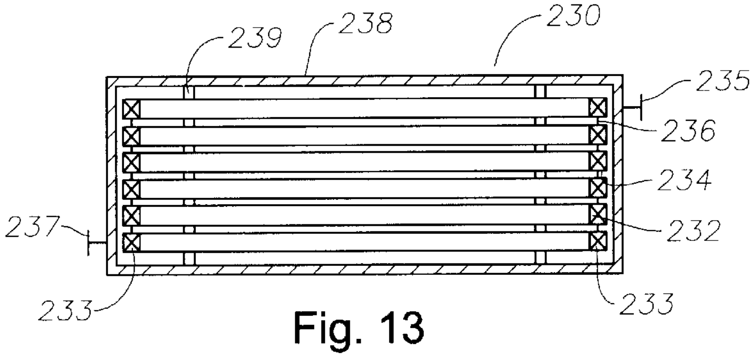
FIG. 13 is a side elevational view of a horizontal pipe modular unit having a pipe bundle independent of the vessel structure which can be off-loaded from the vessel.
Figure 14:
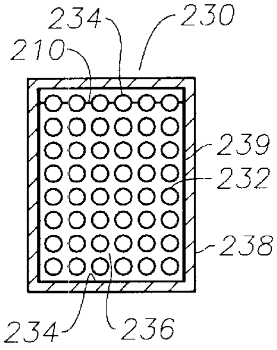
FIG. 14 is a cross sectional view of the pipe modular unit shown in FIG. 13.

Referring now to FIGS. 13 and 14, another embodiment of the present invention includes a gas storage system constructed as a self-contained modular unit 230 rather than as a part of the hull structure 16 of the marine vessel 10. The preferred modular unit 230 includes a plurality of pipes 232, forming a pipe bundle 231, with pipes 232 being substantially parallel to each other and stacked in tiers. The pipes 232 are held in place by a pipe support system, such as straps 210 having ends connected to a frame 238 forming a box-like enclosure around pipe bundle 231, and having a manifold 233, similar to the manifold system shown in FIG. 12, connected to each end of pipes 232. It should be appreciated that the cross beams 18 of FIGS. 8 and 9 may also be used as the pipe support system. The enclosure 238 isolates the pipe bundle 231 from the environment and provides structural support for the piping and pipe support system. The enclosure 238 is lined with insulation 234 thereby completely surrounding pipe bundle 231 and is filled with a nitrogen atmosphere 236. The nitrogen may be circulated and cooled for maintaining the proper temperature of the pipes 232 and stored gas. If stored on deck, the enclosure may be encapsulated by a flexible, insulating skin of panels or semi-rigid, multi-layered membrane that can be inflated by nitrogen and serve as insulation and protection from the elements.

The size and design of the modular unit 230 is primarily determined by the vehicle that will be used to transport the modular unit. In a preferred embodiment of the present invention, the modular unit 230 is transported on the deck of a cargo vessel. The modular unit 230 used in this application is comprised of 36" diameter pipe arranged thirty-six pipes across and stacked ten pipes high. Each pipe would be 500' long providing a total of thirty-four miles of pipe.

In an alternative embodiment, the modular units 230 described above could be constructed with the pipes oriented vertically.

Figure 15:
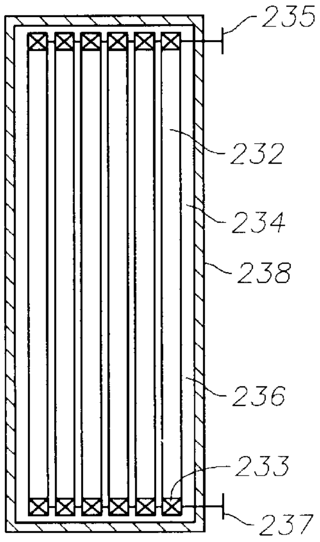
FIG. 15 is a side elevational view of a vertical pipe modular unit.
Figure 16:
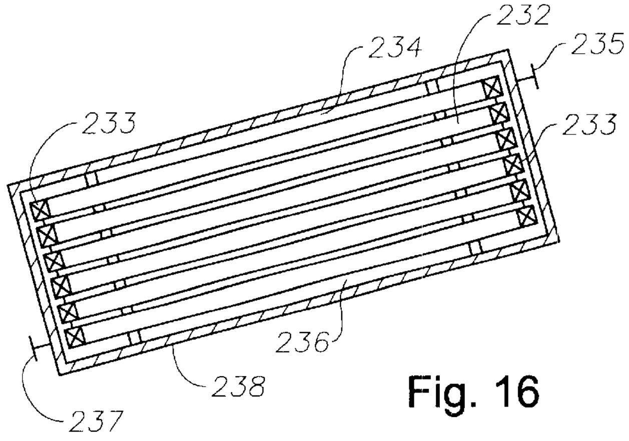
FIG. 16 is a side elevational view of a tilted pipe modular unit.

FIG. 15 illustrates the use of the modular unit 230 in a vertical orientation. The height of the unit 230 would be limited because of increased stability problems as the height of the structure increased. A height of 250' may be considered feasible. The vertical modular units 230 may also be constructed so as to be independent of each other and of the marine vessel in order to allow the loading and unloading of the unit 230 as a whole. FIG. 16 illustrates the modular unit 230 in a tilted orientation to assist in off-loading the gas as hereinafter described. It should be appreciated that modular unit 230 may be disposed in the hull of the marine vessel and/or on the deck of the marine vessel in a preferred orientation such as horizontal or vertical. It is preferable to construct as long a length of pipe as possible in the controlled conditions of a steel mill or other non-shipyard environment in order to maintain quality and reduce costs.

Although the gas storage system of the present invention is preferably part of a new marine vessel, it should be appreciated that the gas storage system may be used with a used marine vessel. There is a requirement now for ships to have a double hull to protect against oil and chemical spillage. Many current ships now have a single hull. It is contemplated that double hull marine vessels are going to replace single hull marine vessels in the near future with the single hull tankers being forced out due to this requirement of a double hull. The preferred embodiment of the present invention does not require a marine vessel with a double hull because the storage pipe for the gas is considered a protective second hull to the single hull of the marine vessel. Each of the pipes is considered another hull or bulkhead to the stored gas. Thus, a double hull on the marine vessel is not required. Therefore, older single-hull marine vessels can be modified for use with the preferred embodiment of the present invention to meet the double-hull requirements. The reuse of older marine vessels is described in U.S. patent application Ser. No. 09/801,146, entitled “Re-Use of Marine vessels for Supporting Above Deck Payloads” and hereby incorporated herein by reference.

One concern with utilizing older marine vessels in transporting CNG is that the gas storage system of the present invention is very light, even when fully loaded with gas. In fact, the fully loaded pipes of the preferred embodiment of the present invention will float in water. The weight of the storage system may not be sufficient to achieve the required draft of the marine vessel. Sufficient draft is required for stability of the marine vessel and to make sure the propellers are at the proper depth in the water.

Figure 17:
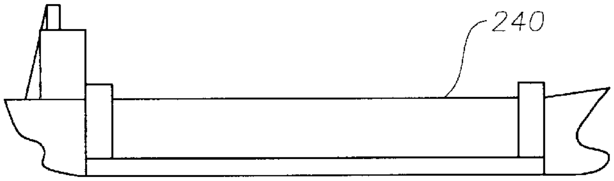
FIG. 17 is a side view of a vessel with a pipe modular unit disposed in the hull of the vessel.
Figure 18:
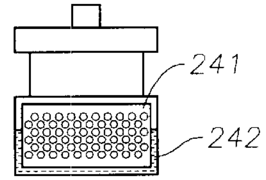
FIG. 18 is a cross sectional view of the vessel shown in FIG. 17.
Figure 19:
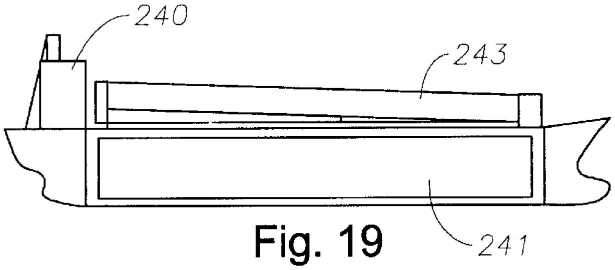
FIG. 19 is a side view of a vessel with pipe modular units disposed in the hull and on the deck of the vessel.
Figure 20:
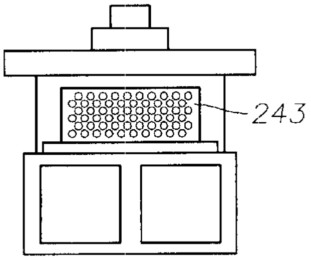
FIG. 20 is a cross sectional view of the vessel shown in FIG. 19.

One way to increase the draft of a marine vessel is by adding ballast. FIGS. 17, 20 shows a cross-section of a marine vessel 240 with a gas storage unit 241 disposed in the hull. Additional ballast 242 is placed around the gas storage unit 241. Less ballast is required as the weight of the cargo increases. In reference to FIGS. 19, 20, an additional modular storage unit 243 may be disposed on the deck of the marine vessel 240 to decrease the amount of ballast required. As shown in FIG. 20*a*, the modular unit 243 is at an incline for convenience in off-loading.

Figure 21:
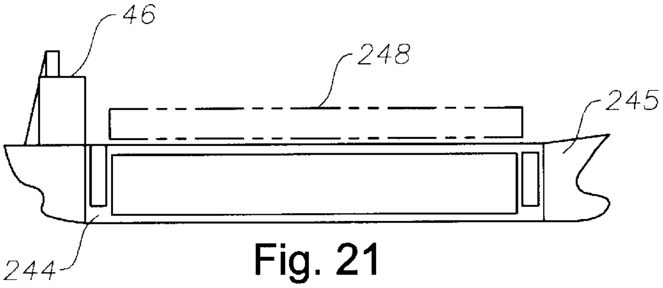
FIG. 21 is a side elevational view of a vessel having a rectangular concrete hull and steel bow and stern.
Figure 23:
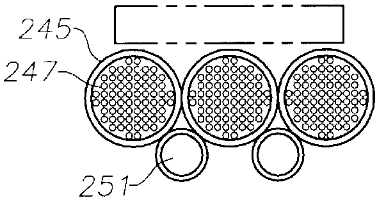
FIG. 23 is a side elevational view of a vessel having one or more round concrete hulls fastened to a steel bow and stern.
Figure 22:
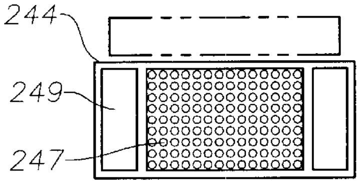
FIG. 22 is a cross sectional view of the concrete hull of FIG. 21 with a pipe modular unit disposed within the hull.

Referring now to FIGS. 21, 20 and 23, there is shown another embodiment of a marine vessel that utilizes existing ship components with a hull section constructed from concrete. Referring now to FIGS. 21, 20, the cargo section of the hull 244 is constructed from reinforced concrete and joined to a bow section 245 and a stern 246 section constructed of steel. The CNG carrying pipes may be built into the concrete cargo section. The concrete hull 244 reduces the amount of ballast required, is corrosion resistant, and inexpensive to fabricate. FIG. 23 illustrates another hull 245 having a circular cross section.

Either of the hull shapes of FIG. 21 or 23 could be made using slip-forming concrete construction techniques. In slip-form concrete construction, only a small section of the hull is constructed at a time. After a section is finished the concrete forms are moved up and another small section is built on top of the existing section. This type of construction normally takes place in a calm water location, such as a fjord, and the concrete structure is extruded down into the water as it is built.

The concrete section of the marine vessel is preferably to be built with sections 249, 251 to allow ballast to be pumped into the ship to control the trim and draft of the marine vessel. The CNG pipes 247 within the concrete section may also serve as post-tensioned reinforcement to the structure since they will expand when pressurized. The concrete hulled CNG transport marine vessel could also be fitted with a deck cargo module 248 for transporting other cargo such as a modular gas storage unit.

Figure 24:
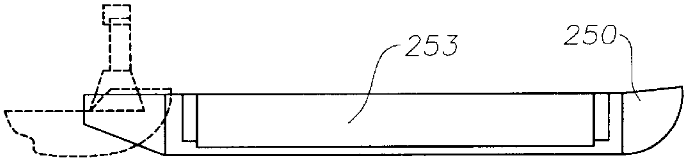
FIG. 24 is a side elevational view of a barge having a pipe modular unit disposed in the hull.
Figure 25:
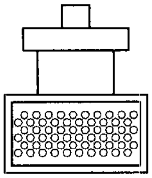
FIG. 25 is a cross sectional view of the barge shown in FIG. 24.

In reference to FIGS. 20 and 24, alternative embodiments of the present invention includes a barge 250 fitted with a modular gas storage system 253 either within the barge as shown in FIGS. 24, 20 or on the deck of the barge as shown in FIG. 23 with the hull 252 of the barge being used for oil, or other product, storage.

Safety Systems

After construction of the marine vessel, all of the air surrounding the pipe bundle is displaced with a nitrogen atmosphere. Each of the compartments or enclosures are bathed in nitrogen. One of the primary reasons for maintaining a nitrogen atmosphere is that it protects against corrosion of the pipes 12.

Further, the nitrogen provides a stable atmosphere in each bulkhead compartment 42 or enclosure 238 which can then be monitored to determine if there is any leaking of gas from the pipes 12. In the preferred embodiment, a chemical monitor is used to monitor each compartment 42 or enclosure 238 to detect the presence of any leaking hydrocarbons. The chemical monitoring system is continually operating for leak detection and monitoring of system temperature.

Referring again to FIG. 5, a flare system 100 communicates with each bulkhead compartment 42 between the bulkheads 40. If a leak is detected then the flare system 100 is activated and bleeds off the gas in the compartment to safely burn off the leaking gas or alternatively, vent the gas to atmosphere. The flare system 100 includes a particular flare stack 102 for burning off any leaking gas. Flaring using the bulkhead flares stacks 102 also allow the nitrogen in the compartment 42 to escape and that compartment has to again be bathed in nitrogen.

It is anticipated that the possibility of a collision of sufficient magnitude to rupture the side of the marine vessel 10 and produce an escape route for leaking storage containers is very low. As a part of the design of the marine vessel 10, the storage compartment 42 will be encased in a wall of some insulating foam 24. In the preferred embodiment, a polyurethane foam 24 will be used having a thickness of about 12–24 inches, depending on application. This not only serves to keep the compartment 42 sufficiently insulated, but creates an added protective barrier around the storage pipes 12. A collision would have to not only rupture the hull 16 of the marine vessel 10 but also the thick polyurethane barrier 24.

Another safety advantage of the marine vessel design and gas storage design is that since the density of the gases in the pipes 12 are much less than that of water, the filled pipes 12 create buoyancy for the marine vessel. Even if most of the bulkheads compartments 42 were flooded, the marine vessel 10 would still float. This kind of structure can be viewed as a secondary bulkhead system. Thus, the primary bulkhead system is actually redundant and although required by regulations, may not be needed.

An additional and separate flare system 104 is also made a part of the marine vessel 10 and communicates directly with the manifolds 76, 78 or directly with the pipes 12 as necessary. For example, if it is necessary to bleed some of the natural gas off, such as because the marine vessel 10 has been stranded at sea and the temperature of the gas can not be maintained in the pipes 12, the natural gas is bled off through the separate flare system 104, without disturbing the nitrogen in the compartments 42.

Testing

Based on the ABS, once every five years, 10% of the pipe must be tested or inspected for pressure integrity. One method is to send smart pigs through a sampling of the pipes. These smart pigs examine the pipe from the inside. Another method is to pressurize the pipes when they are full of the displacing liquid during an off-loading procedure. The pressure can be monitored to test the integrity of the pipe on the marine vessel. It is preferred that after the pipe has been tested, underwater hull inspection will also be performed.

On-Loading Method

Separate manifold systems are used for both on-loading and off-loading the gas. When the marine vessel is loaded with gas for the very first time, natural gas is pumped through the pipe and back through a chiller to slowly cool the pipe to a −20° F. The structure may also be cooled by cooling the nitrogen blanket surrounding the structure. Once the pipe is chilled down, the inlet valves 91, 93 are closed and the natural gas is compressed within the tiers of pipe. Both sets of manifolds 90, 92 could be used.

If, nevertheless, it is desired to avoid the drop in temperature of the gas in the pipe initially, the natural gas can be pumped into the pipe at a low pressure. The low pressure natural gas expands but will not chill the pipe enough to cause thermal shock or to over pressure the pipe at these low pressures. As the marine vessel continues to be loaded with natural gas, the injection pressure of the natural gas is raised to the optimum pressure of 1,800 psi, while cooling to below −20° F. Ultimately the compressed gas is at a temperature of −20° F. and a pressure of 1,800 psi.

Off-Load Method

Referring now to FIGS. 12 and 29, the manifold system is used for off-loading by pumping a displacement fluid through the master manifold 90 and into the tier manifolds 76 and column manifolds 76. The valves 145 and 121 are open to pump the displacement fluid through the conduits 72 and into one end 64 of a pipe 12. Simultaneously, the valves 91 and 122 at the other end 66 are opened to allow the gas to pass through conduit 74 and into column manifold 78 and tier manifold 88. The displacement fluid enters the bottom of the end cap 68 and the conduit 72 and the offloading gas exits at the top of end cap 70 and conduit 74 at the other end 66 of the pipe 12. The displacement fluid enters the low side and the gas exits the top side of the pipe 12. Thus during off loading, displacement fluids are injected through one tier manifold 86 forcing the compressed natural gas out through the other tier manifold 88. As the displacing liquid flows into one end of the pipe, it forces the natural gas out the other end of the pipe.

One preferred displacement fluid is methanol. By tilting the ship, or inclining the gas containers, the interface between the methanol and the natural gas is minimized thereby minimizing the absorption of the natural gas by the methanol. Methanol hardly absorbs natural gas under standard conditions. However, because of the high pressures, there may be some absorption of natural gas by the methanol. It is desirable to keep the absorption to a minimum. Whenever natural gas does get absorbed by the methanol, it is removed in the storage tank by compressing it from the gas cap at the top of the tank. Tilting the marine vessel for off-loading would not be used if the displacing fluid was completely unable to absorb the gas. An alternative displacement fluid is ethanol. The preferred displacement fluid has a freezing point significantly below −20° F., a low corrosion effect on steel, low solubility with natural gas, satisfies environmental and safety considerations, and has a low cost One preferred method includes tilting the marine vessel lengthwise at the dock or off-loading station. This is done to minimize surface contact between the displacement fluid and the natural gas. By tilting the marine vessel, the contact area between the displacement fluid and the gas are slightly larger than the cross section of the pipe. The bow would probably be raised because the weight of the engine would be in the stern, although in shallow water lowering the stern may not be possible. The marine vessel would be tilted approximately between 1°–3°. This tilting could be accomplished by submerging a barge under the marine vessel and then making the barge buoyant. Another way to tilt the marine vessel is to shift the ballast within the marine vessel to create the desired amount of tilt.

Alternatively, the storage structure may be inclined at an angle while the marine vessel is maintained level. Another preferred method would be to construct the storage system so that the pipes are always at an angle to the horizontal. Vertical storage units such as in FIG. 15 also have the advantage of decreasing the absorption of the gas into the transfer liquid because the contact area between the transfer liquid and the stored gas is minimized. It is preferable to incline the pipes at enough of an angle to overcome any natural sag in the pipe between the supports in order to ensure that any liquid caught in the sagging pipe will be removed.

In reference to FIG. 27, the modular storage pack is shown with an inlet 237 and outlet 235 on each end of the storage pipe. The outlet 235 on one end is at the top of the pipe bundle while the inlet 237 on the opposite end is at the lower end of the pipe bundle. The lower inlet 237 is used to pump transfer liquid into the pipe bundle while the upper outlet 235 is used for the movement of gas products. This placement of the inlet and outlet helps minimize the interface between the transfer liquid and the product gas.

The feature can be further enhanced by inclining the storage pipes so that the gas outlet 235 is at the high point and the liquid inlet 237 is at the low point. Referring to FIGS. 16 and 19, this inclination can be achieved by inclining the module unit or by installing the individual pipes at an angle during construction. This angle could be any angle between horizontal and vertical with an larger angle maximizing the separation between the transfer liquid and the product.

The marine vessel will preferably dock at an off-loading station which has been built in accordance with the present invention. Thus the docking station may include means for tilting the marine vessel. The means for tilting the marine vessel may include an underwater hoist for lifting one end of the marine vessel or a crane or a fixed arm that swings over one end of the marine vessel. The fixed arm would have a hoist for the marine vessel. Preferably, the bow is raised causing the liquid to minimize contact with the natural gas. The displacement fluid and gas would form an interface which pushes the gas to the bow manifold for off-loading.

It is possible that in the transport and storage of certain gases and liquids, the natural separation between the product and the displacing liquid, i.e. density, miscibility, surface tension, etc., is not sufficient to prevent undesired mixing of the two components. In such cases, offloading the gas using a displacement liquid may cause some concern in that the displacing liquid may mix with the gas. In order to prevent this from happening, a pig may be placed in the pipe to separate the displacement liquid from the gas.

Now referring to FIGS. 30 and 31, pigs 220, such as simple spheres or wiping pigs, can be installed within each pipe 222. Pigs 220 of this type are commonly used in pipelines to separate different products. The pig 220 is located at one end of the pipe 222 with the major end of the pipe 220 being filled with gas 224. The displacement liquid 226 is then introduced in the end of the pipe 222 with the pig 220. As the displacement liquid enters the pipe 222, the pig 220 is forced down the length of the pipe 222 pushing the gas 224 ahead of it until the pig 220 reaches the other end of the pipe 222 and the gas is offloaded from the pipe 222.

When the storage pipe is essentially evacuated, the liquid pumping stops and valving switches over to a low pressure header allowing the available pressure to push the pig back to the first end of the pipe 222 pushing out all of the displacement liquid 226. One disadvantage is that there may be additional horsepower requirements for the pump to push the displacement liquid 224 against the pig 220 to move it at an adequate velocity to maintain efficient sweeping. The pipes will also have to be fitted with access for the maintaining and replacing of pigs 220.

The docking station includes a tank full of liquid to be used to displace the natural gas. Even though the marine vessel or pipe bundle is tilted, some of the natural gas will be absorbed by the displacement liquid. When the displacement liquid returns to the storage tank, the natural gas which has been absorbed by the displacement liquid will be scavenged off.

Alternatively the marine vessel includes a tank of displacing liquid. The tank would be carried by the marine vessel so that the marine vessel can serve as a self-contained unloading station.

The manifold system accommodates a staged on-loading and off-loading of the gas using the individual tiers of connected pipes. If all the pipes were unloaded at one time, the off loading would require a large volume of displacement fluid and an uneconomic amount of horsepower to move the displacement fluid. The displacement of the fluid requires at least the same pressure as that of the compressed natural gas. Thus, if the gas is all off loaded at one time, all of the displacement fluid must be pressurized to the same pressure as the gas. Therefore, it is preferred that the off-loading of the gas using the displacement liquid be done in stages. In a staged off-loading, one tier of pipes is off-loaded at a time and then a another tier of pipes is off-loaded to reduce the amount of horsepower required at any one time. During off-loading, once the first tier is off-loaded, then as the displacement fluid completely fills the first tier of pipes which previously had compressed natural gas, that displacement fluid may be directed to the next tier of pipes to be off-loaded and is used again.

After the gas is removed from a tier, the displacement fluid is pumped back out to the storage tank with other displacement fluid in the storage tank being pumped into the next tier to empty the next tier of pipe containing compressed natural gas.

The natural gas is offloaded in stages to save horsepower and also reduce the total amount of displacement fluid. The displacement fluid is ultimately recirculated back to the onshore or marine vessel storage where any natural gas that has been absorbed by the displacing liquid is scavenged. The onshore or marine vessel storage is kept chilled.

In transporting heavier composition gases, it may be desirable to remove some or most of the higher molecular weight components before providing the gas to the user. Some users, such as a dedicated power plant, may want the added heating value and not want the heavier hydrocarbons removed. In this scenario, the marine vessel has, for example, 0.7 specific gravity gas which is about 83 mole percent methane but includes other components, such as ethane, and still heavier gas components, such as propane and butane, and is stored at a temperature of −20° F. and at a pressure of about 1,350 psi. The gas will pass through an expansion valve at the dock and is allowed to expand as it is offloaded. As the gas cools down and the pressure drops, the liquids will drop out, or gas leaves the critical phase, and becomes liquid. The liquid hydrocarbons will start to form once the pressure drops to about 1000 psia and will be completely removed from the gas as the pressure approaches 400 psia. As the liquids fall out, they are collected and removed.

This process will be accelerated by the temperature drop associated with the expansion of the gas, therefore no supplementary cooling is required. The prior art processes require a chiller to chill the gas to remove the liquids. The amount of expansion and resultant chilling is dependent on the gas composition and the desired final product. It is doubtful that the gas will have to be recompressed for the receiving pipeline because of the reduced temperature of the gas. However, if the gas pressure must be reduced to a pressure below that required for the pipeline, the gas would be recompressed.

Referring again to FIG. 28, the pipe on the marine vessel may be divided into four horizontal tiers 200, 210, 220, and 230. Each tier 200, 210, 220, and 230 represents a bundle of pipes 202, 212, 222, and 232. The bundles may be divided evenly across the cross section or they may be divided as regions, such as the group of pipes around the perimeter as one tier and an even division of the remaining pipes as the other tiers. Each tier 200, 210, 220, and 230 has an entry tier manifold 76, 214, 224, and 234 and an exit tier manifold 91, 216, 226, and 236 at each end of pipes 202, 212, 222, and 232 extending to master manifolds 90 and 88 which extend to connections at the dock where further manifolding takes place.

Displacement liquid held in storage tank 300 is introduced into tier 200 through manifold 90 where valve 145 is open and valves 272, 274, 276, and 121 are closed. The displacement liquid is pumped under pressure through valve 145 into manifold 90 and into pipes 202. As the displacement liquid enters pipes 202, gas is forced out into manifold 206, through valve 91 and manifold 88 towards the dock. Assuming a 0.28 BCF marine vessel, displacement liquid is pumped into tier 200 at a rate of $$Q=1.068E6\ ft^3/10\ hrs=13315\ gpm \tag{9}$$

Where a total offload time of 12 hours has been assumed, with the last two hours reserved for liquid removal from the last tier, tier 232, 10 hours of displacement time results.

When tier 200 is fully displaced, the displacement liquid is removed back through manifold 76 and out through valve 121 and manifold 260, with valve 145 now closed. The displacement liquid is fed back to the storage tank 300 where displacement liquid is simultaneously being pumped to tier 210. Tier 210 is filled with displacement liquid from storage tank 300 through manifold 90, valve 272 and manifold 214, with valves 145, 274, and 276 closed. Tier 210 gas is forced out in the same fashion as tier 200 with gas evacuating through manifold 216, valve 246 and manifold 88 towards the dock. In effect the displacement liquid used in tier 200 becomes part of the reservoir used to displace the gas in tier 210. Thus, there is less need to store enough displacement liquid to fill the entire set of pipes aboard a ship. This process is repeated with each successive tier 220 and 230 until the gas containment system has been evacuated or as much gas remains in the system as is desired for the return voyage. The electric horsepower for this operation, assuming a pressure rise of 1500 psi from tank to marine vessel, is $$Hp=1500\times144\times13315/0.8\times2.468E5=14567 \tag{10}$$

where an overall pump efficiency of 0.8 has been assumed. The gas has been allowed to expand from 1840 to 1500 psi in initial offloading. Converting the horsepower to kw-hrs over the 10 hour period and using the 0.28 BCF (less fuel gas for a 2000 mile round trip) gives a cost per MCF of $0.0157, for a kw-hr cost of $0.04.

The tiered off-load system has other advantages in that the liquid storage tank, which is required, is much smaller, say about 50,000 bbls vs 200,000 bbls for full storage. Also, since the amount of liquid stored on the marine vessel during off-load is about a third of what it would be without tiering, the pipe support structure need not be as strong, i.e. the structure required to support liquid filled pipe can be stronger than that required to support gas filled pipe.

The displacing liquid is at the same temperatures as the gas and therefore it produces no thermal shock on the pipe. After the natural gas has been off-loaded and the marine vessel is returning for another load of gas, the pipes will still contain a small amount of natural gas reserved to fuel the return trip. This remaining gas on the return voyage is below −20° F. because it has expanded. The temperature will drop even more as the gas is used for fuel. Thus, the pipes may be a little cooler when they return, depending on the effectiveness of the insulation.

After the pipes are refilled with compressed natural gas, the temperature is returned to −20° F. Preferably the marine vessel is constantly on-loading and off-loading and transporting natural gas such that the temperature of the pipes is maintained within a small range of temperatures. The pipe will hold approximately 50% of the load at ambient temperature. Therefore, if the gas temperature rises to an unacceptable level, the most that needs to be flared is ½ of the natural gas. The remaining load and pipes will then be at ambient temperature. Thus, when the marine vessel reaches its destination, the compressed natural gas is off-loaded, and then when the marine vessel is reloaded with natural gas, it is necessary to cool down the pipes using a method similar to that used when the first load of compressed natural gas is loaded onto the marine vessel.

The displacement fluid is preferably off-loaded to an onshore insulated tank. There are pumps on the marine vessel for pumping the displacement fluid to the onshore tanks. The tank is maintained at low temperatures using a chiller so that when the displacement fluid is circulated onto the marine vessel, low temperature control is not lost. This prevents thermally shocking the pipe. The displacement fluid has a freezing point well below the operating temperature of the gas storage system.

There must be enough fluid to displace at least one tier of the pipe plus enough to fill the tier manifolding and the pump sump in the onshore tank. However, because there are a plurality of tiers of pipes on the marine vessel, it is unnecessary to have sufficient methanol to completely displace the entire 30 miles of pipe on the marine vessel in one pass. Probably, about 250,000 cubic feet of fluid will be required. This is about 50,000 barrels of fluid which is not a large storage tank.

One of the reasons to use a displacement fluid is to prevent expanding the natural gas on the marine vessel during off-load. If the natural gas expanded on the marine vessel, there would be a drop in temperature. Therefore, during off-loading, the valves 91, 122 are opened on the marine vessel allowing the natural gas to completely fill the manifold system. The master manifolds 88 extend to closed valve 146 at the on-shore manifolds such that the natural gas completely fills the manifold system to the closed valve 146 on-shore. Thus the pressure drop occurs across the valve 146 which off-loads the gas. The gas will expand some as it fills the manifold system. However this is an insignificant amount as compared to the whole load of natural gas on the marine vessel. There is only a few hundred feet of manifold pipe to the closed valve as compared to 30 miles of 36 inch diameter pipe on the marine vessel.

When the manifold system extending to the closed valve reaches marine vessel pressure, the closed valve is opened and all expansion takes place across the valve. This keeps the pressure drop from occurring on the marine vessel. At the valve, the temperature is going to drop a lot and that provides an opportunity to remove the heavier hydrocarbons from the natural gas. The gas is then normally warmed, although it need not be warmed if it were being passed directly to a power plant.

In this example, it takes 12 hours to offload the natural gas. The time to on-load or off-load is a function of the equipment.

Alternatively, the offloading of natural gas could be achieved by simply allowing the gas to warm and expand. The storage system could be warmed in ambient conditions or heat could be applied to the system by an electrical tracing system or by heating the nitrogen surrounding the system. It may also be necessary to scavenge gas remaining in the storage system through the use of a low suction pressure compressor. This method is applicable to mainly slow withdrawal where the marine vessel remains at the offload station for an extended period of time.

CNG Transportation System

The natural gas is preferably loaded at a port, but may also be loaded from a deep sea location in the ocean where a pipeline may not be feasible. Also if regulations prevent flaring, use of a marine vessel may be more economic than other options such as re-injecting the gas. Multiple offshore fields can be connected to a central loading facility, providing the combined loading rates are high enough to make efficient use of the marine vessel(s).

Referring now to FIG. 29, there is described a detailed example of the overall method of transportation of the gas, including a further description of the on-loading and off-loading of the gas. The preferred marine CNG transportation system of the present invention is preferably directed to a source of natural gas such as a gas field 111. The composition of the natural gas delivered from a gas field 111 is preferably pipeline quality natural gas, as is known in the art. A loading station 113, capable of receiving gas at a pressure of approximately 400 psi or other pipeline pressure, is provided for preparing the gas for transportation.

Loading station 113 preferably includes compressing and chilling equipment, such as compressor/chiller 117, as is known in the art, for compressing the natural gas to a pressure of approximately 1800 psia, for the 0.6 specific gravity gas example, and chilling the gas to approximately −20° F. For example, compressor/chiller 117 may comprise multiple Ariel JGC/4 compressors driven by Cooper gas-fired engines, depending on capacity, with York propane chilling systems. Loading station 113 is preferably sized to load CNG at a rate greater than or equal to approximately 1.0/0.9 times the rate at which CNG will be consumed by end users, to optimize the capital cost of the loading station 113 and optimize its operating costs.

Loading station 113 is also preferably provided with a loading dock 131 for loading the compressed and chilled natural gas aboard a CNG transporting marine vessel for transporting the gas produced from the gas field 111. The gas field 111 and the loading station 113 may be connected by a conventional gas line 151 as is well known in the art. Likewise, the compressor/chiller 117 is connected to loading dock 131 by an insulated conventional gas line 152. Marine vessels, such as ship 10, is provided for transportation of the CNG. A plurality of such ships is preferably provided so that a first ship 10 can be loaded while a previously loaded second ship is in transit. In actual practice, the choice between ships or barges as the marine vessel of choice will depend on the relative capital costs and the relative travel time between the two options, barges typically being less expensive but slower than ships. Although the preferred method of the present invention will be described with respect to ships, it should be understood that ships, barges, rafts or any other type of water transport may be used without departing from the scope of the invention.

A receiving station 112 is provided for receiving and storing the transported natural gas and preparing it for use. The receiving station 112 preferably comprises a receiving dock 141 for receiving the CNG from the ship 10, and an unloading system 114 in accordance with the present invention for unloading the CNG from ship 10 to a surge storage system 181.

Surge storage system 181 may comprise a land based storage unit or underground porous media storage, such as an aquifer, a depleted oil or gas reservoir, or a salt cavern. One or more vertical or horizontal wells (not shown), as are well known in the art, are then used to inject the gas and withdraw it from storage. The surge storage system 181 preferably is designed with a CNG storage capacity that is sufficient to supply the demand of users, such as a power plant 191, a local distribution network 192, and optional additional users 193, during the time period between arrival of the second ship 120 and first ship 10 at receiving dock 141. For example, surge storage system 181 may have the capacity to accept two ship loads of CNG and provide sufficient CNG to supply users 191, 192 (and 193, if provided) for about two weeks without being re-supplied. The surge storage system 181 is required in some cases to allow a ship 10 to unload CNG as rapidly as possible and to allow for a disruption in demand for CNG such as a failure of power plant 191. Additionally, surge storage system 181 should have about two weeks of reserve capacity to supply users 191, 192 in the event a hurricane or earthquake disrupts the supply of CNG.

Receiving dock 141 is connected to the unloading system 114 by displacing liquid line 144. The receiving dock 141 is also connected to the surge storage system 181, by gas line 161, as is well known in the art. Similarly, gas lines 163 and 164 connect the surge storage system 181 to gas users, such as power plant 191 and local distribution network 192, respectively. Additional gas lines 165 may optionally connect surge storage system 181 to the additional users 193, if required, without departing from the scope of the present invention.

Alternatively, where a large existing gas distribution system is already in place, surge storage system 181 may not be necessary. In this case, line 161 is connected directly to lines 163, 164 (and 165, if provided) for discharging the CNG directly into the existing distribution system. Further, where the demand rate of CNG by users 191, 192 (and 193, if provided) is very high, unloading system 114 may be designed with sufficient capacity that the rate of discharge of CNG from ship 10 equals the total demand rate by users 191, 192, 193. It can be seen that in such a case, receiving dock 141 and unloading system 114 are in substantially constant use. Finally, surge storage system 181 may comprise an on-shore, or offshore, pipe with satisfactory surge capacity, conventional on-shore storage, a system of cooled and insulated pipes using the methods of the present invention, or the CNG marine vessel itself may remain at the dock to provide a continuing supply, although these options significantly increase the cost of receiving station 112.

In operation, pipeline quality natural gas flows from gas field 111 to loading station 113 through gas line 151. One skilled in the art will appreciate that the present invention may load natural gas from an offshore collection point at an offshore facility. The present invention should not be limited to on-shore gas fields. At loading station 113, compressor/chiller 117, as an example, compresses the natural gas to approximately 1800 psi and chills it to approximately −20° F., to prepare the gas for transportation. The compressed and chilled gas then flows through gas line 152 to loading dock 131. The gas is then loaded aboard ship 10 by conventional means at loading dock 131.

In the embodiment illustrated schematically in FIG. 29, second ship 120 has already been loaded with CNG at loading dock 131. After loading, second ship 120 then proceeds on to its destination. A portion of the CNG loaded may be consumed to fuel ship 120 during the voyage. Fueling ship 120 with a portion of the loaded CNG has the additional advantage of cooling the remaining CNG, by expansion, thus compensating for any heat gained during the voyage and maintaining the transported CNG at a substantially constant temperature. While second ship 120 is in route, first ship 10 is loaded with natural gas at loading dock 131. Although only two ships 10, 120 are shown, it will be recognized by one skilled in the art that any number of ships may be used, depending on, for example: the demand for natural gas, the travel time for the transporting ships 10, 120 to travel between loading dock 131 and receiving dock 141, and the rate of gas production from gas field 111.

Upon its arrival at its destination, second ship 120 is unloaded at receiving dock 141 of receiving station 112. Unloading system 114 unloads the natural gas transported aboard second ship 120 by allowing the gas to first expand to the pressure of surge storage system 181 and then to flow through gas line 161. Remaining gas is unloaded using displacing liquid line 144, as will be described further below. The natural gas in surge storage system 181 is then provided through gas lines 163 and 164 to users, such as the power plant 191 and the local distribution network 192, respectively. Thus, gas may be continuously withdrawn from surge storage system 181 and supplied to users 191, 192 although gas is only periodically added to surge storage system 181.

During the process of unloading, sufficient gas is allowed to remain aboard second ship 120 to provide fuel for the return voyage to loading dock 131. After unloading, second ship 120 undertakes the return voyage to loading dock 131. First ship 10 then arrives at receiving dock 141 and is unloaded as described above with respect to second ship 120. Second ship 120 then arrives at loading dock 131 and the on-loading/off-loading cycle is repeated. The on-loading/off-loading cycle is thus repeated continuously.

When more than two ships 10, 120 are used, the on-loading/off-loading cycle is also repeated continuously. The frequency with which the on-loading/off-loading cycle must be repeated (and thus the number of ships required) depends on the rate at which gas is withdrawn from surge storage system 181 for supply to users 191, 192 and the capacity of surge storage system 181.

Referring now to FIG. 32, there is shown a schematic representation of an embodiment of a compressed natural gas off-loading system for use in practicing the method of the present invention. The off-loading system, denoted generally by reference numeral 114, preferably comprises a displacing liquid 143, a insulated surface storage tank 142 for storing the displacing liquid 143, and a pump 141 connected to an outlet of insulated surface storage tank 142 for pumping the displacing liquid 143 out of surface storage tank 142. A liquid return line 144*a* and return pump on shore are provided to return the liquid to the liquid storage tank 142. One or more sump pumps 141*a* are provided on the marine vessel 10. Sump pumps 141*a* on the marine vessel 10 returns the liquid to the tank 142 through the return manifold system 144*a*.

The displacing liquid 143 preferably comprises a liquid with a freezing point that is below the temperature of the CNG transported aboard ship 120, which is approximately −20° F. Further, the composition of displacing liquid 143 preferably is chosen so that the CNG has only negligible solubility in displacing liquid 143. A suitable displacing liquid which meets these requirements, and is relatively readily available at reasonable cost is methanol. Methanol is known to freeze at approximately −137° F., and CNG has low solubility in methanol.

A displacing liquid line 144 is preferably provided to connect the pump 141 to ship 10 or 120. A first displacing liquid valve 145 is preferably disposed in displacing liquid line 144 to prevent the flow of displacing liquid when valve 145 is closed, such as when ship 120 is not present. Similarly, a first gas valve 146 is preferably disposed in gas line 161 to prevent the backflow of gas when valve 146 is closed, such as when ship 120 is in transit.

Pump 141 preferably comprises one or more pumps and pump drivers, arranged in series and/or parallel, and capable of producing sufficient methanol pressure at its discharge to overcome the pressure of surge storage system 181, the methanol flow losses in displacing liquid line 144, and any downstream flow losses in displacing the CNG to surge storage system 181. The capacity of reversible pump 141 depends on the unloading rate that is desired for ship 120.

In the embodiment described above with respect to FIG. 32, ships 10, 120 are illustrated as including multiple storage pipes 12 for storing the gas being transported. It will be understood by one skilled in the art that any number of gas storage pipes 12 may be carried aboard ships 10, 120 without departing from the scope of the present invention. For example, multiple gas storage pipes 12 may include 20 inch diameter welded sections of X-80 or X-100 steel pipe, rack mounted and manifolded together in accordance with relevant codes. Such pipes may be satisfactory in terms of both performance and cost. Other materials may of course be used, provided they are capable of providing satisfactory service lifetimes and are able to withstand the CNG conditions of approximately −20° F. and approximately 1800 psi.

Likewise, many acceptable means of insulating gas storage pipes 12 are possible, provided the CNG stored therein is maintained at a substantially constant temperature of approximately −20° F. over the time of its transit from loading dock 131 to unloading dock 141, including any idle time and any time required for the on-loading and off-loading processes. For example, with the 20 inch diameter pipe described above and expansion cooling provided by fueling the ship with CNG, an approximately 12–24 inch layer of polyurethane foam around the outside of the gas storage pipes 12 should result in the temperature being maintained at around –20° F. Other insulation, such as a 36 inch thick layer of perlite having a thermal conductivity of approximately 0.02 Btu/hour/foot/° F. or less are also acceptable.

The unloading process is then practiced as previously described.

Cost per Distance of Travel

Figure 33:
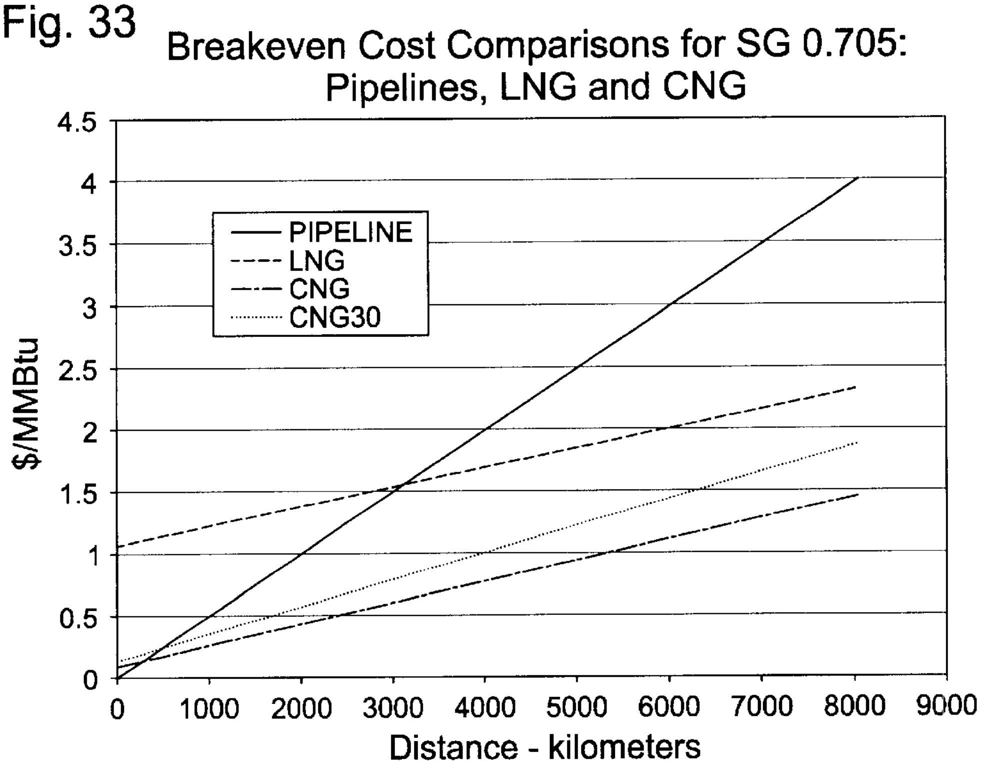
FIG. 33 is a graph of transportation costs per travel distance for LNG, CNG or pipelines for gas having a specific gravity of 0.705.
Figure 34:
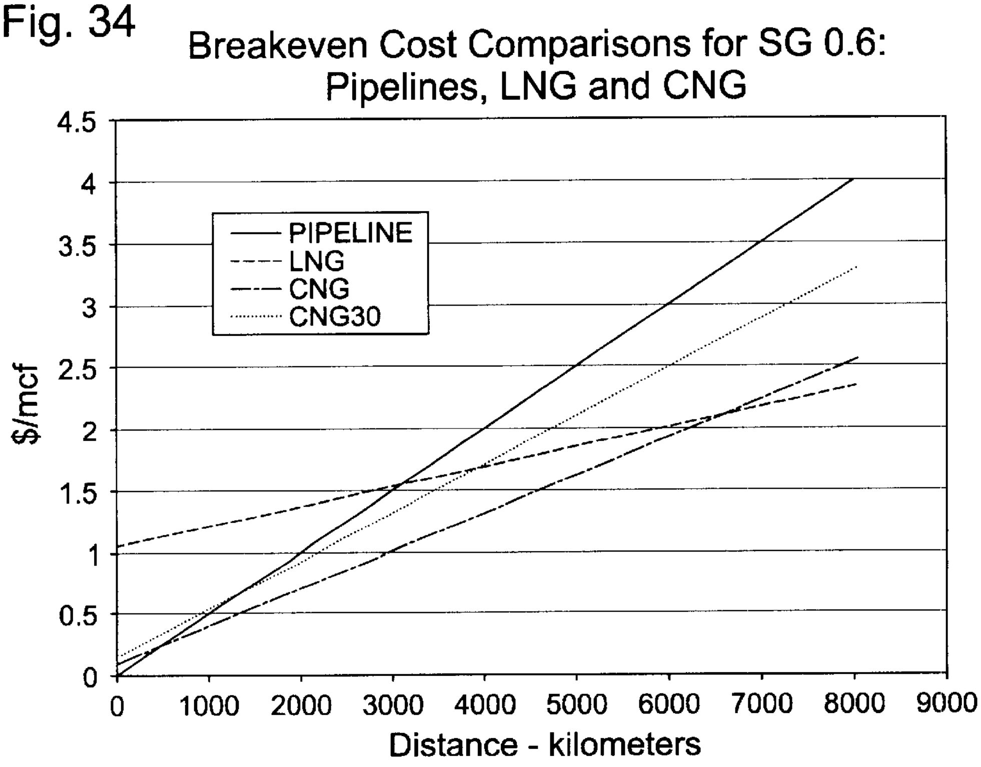
FIG. 34 is a graph of transportation costs per travel distance for LNG, CNG or pipelines for gas having a specific gravity of 0.6.

FIG. 33 shows the dollar break-even cost per million BTU's of natural gas with a specific gravity of 0.7 versus the distance that the gas is being shipped for LNG 400, CNG 410, CNG 30 and pipeline 430. The LNG and pipeline data are taken from the Oil & Gas Journal dated May 15, 2000. LNG has a high initial cost because of the equipment that has to be built to handle LNG. The compressed natural gas has the distinct advantage of much lower starting costs as compared to that of LNG. All the present invention requires is some standard compressors and chillers to load and off load the compressed natural gas. Line 430 represents the use of a pipeline. Line 410 is the present invention for natural gas having a specific gravity of 0.7. FIG. 34 shows a similar graph for natural gas having a specific gravity of 0.6. The graph for gas having specific gravity of 0.7 is very economical because the compressibility factor is so low at 0.4. At 0.6, the natural gas is almost pure methane but still is competitive up to a travel distance of 6,500 kilometers. Pipeline is competitive up to a distance of about 500 kilometers. Thus, the present invention is competitive from about 300 miles to 4,000 miles transportation. The cost graphs include every cost associated with the transportation of the gas including amortization, insurance, interest, operating costs, etc. The slope of the lines on the graph shows the difference in transportation costs. The graphs also include the cost of the marine vessel. These graphs are at break even and do not represent taxes or profits.

One of the possible locations for the use of the present invention is Venezuela. Thus, looking at the 0.7 specific gravity chart on cost versus distance, one can determine the cost from Venezuela to any port in the Caribbean. The invention is economical from anywhere in Venezuela to as far as the southeastern part of the United States. To use the graphs, enter the distance, move vertically to the CNG line and read across to determine the cost. Thus for Charleston, S.C., a distance of 1900 miles from eastern Venezuela, the breakeven cost is $0.60/mcf. This is based on a delivery rate of 0.5 BCF/day. Economies of scale may apply.

Alternative Uses

While it is preferred that the storage system of the present invention be used at or near its optimum operating conditions, it is considered that it may become feasible to utilize the system at conditions other than the optimum conditions for which the system was designed. It is foreseeable that, as the supplies of remotely located gas develop and change, it may become economically feasible to employ storage systems designed in accordance with the present invention at conditions separate from those for which they were originally designed. This may include transporting a gas of different composition outside of the range of optimum efficiency or storing the gas at a lower pressure and/or temperature than originally intended.

The pipe based storage system of the present invention can also be used in the transport of liquids. The advantage to the present invention relates to the design factor for the pipe as compared to a tank. If the pipe only needs to be built twice as strong as is required (i.e. a design factor of 0.5), and the design factor for the tank is 0.25, then the tank will be four times stronger than is required. For example, liquid propane has a particular vapor pressure and the storage pipe can be designed for a pressure twice as great as the vapor pressure of the liquid propane. This means that the storage of liquid propane in a pipe would be cheaper than in a tank. It would also be cheaper to use pipes for liquid propane if the propane was going to be transported on a marine vessel. The liquid propane would be transported in the pipe at ambient temperature.

While a preferred embodiment of the invention has been shown and described, modifications thereof can be made by one skilled in the art without departing from the spirit of the invention.

What is claimed is:

1. A gas storage system designed for a gas having a particular specific gravity comprising:

a reservoir of hydrocarbons having a first specific gravity;

a plurality of pipes to store natural gas having a second specific gravity; and a conduit communicating said reservoir with the natural gas to be stored in said pipes for adding hydrocarbons to said natural gas in such an amount such that the resultant gas to be stored in the pipes has a specific gravity substantially the same as the particular specific gravity for which the gas storage system was designed.

2. The system of claim 1 wherein the plurality of pipes are selected for storage conditions such that the compressibility factor of the stored gas is minimized.

3. A method of storing natural gas in a gas storage system designed for a gas having a particular specific gravity, the method comprising:

producing a natural gas having a first specific gravity to be stored in the gas storage system; and adding or removing a hydrocarbon gas of a second specific gravity to the produced natural gas until the resultant natural gas has the same specific gravity as the particular specific gravity for which the gas storage system was designed.

4. The method of claim 3 wherein the gas storage system is disposed in a marine vessel and storage facilities are disposed in the marine vessel for the hydrocarbon gas to be added or removed.

5. The method of claim 3 wherein natural gas is added or removed such that the specific gravity of the produced gas is the same as the specific gravity of the particular gas composition.

6. The method of claim 3 wherein any added gas is dropped out of the produced gas and is removed as the produced gas expands and cools upon being off-loaded.

7. The method of claim 6 wherein the removed gas is returned to a reservoir on the marine vessel.

8. The method of claim 3 wherein the hydrocarbon gas of a second specific gravity is a heavier hydrocarbon than the produced gas.

* * * * *